United States Patent [19]
Low et al.

[11] Patent Number: 6,131,095
[45] Date of Patent: Oct. 10, 2000

[54] METHOD OF ACCESSING A TARGET ENTITY OVER A COMMUNICATIONS NETWORK

[75] Inventors: Colin Low, Wootton-Under-Edge; Andrew Franklin Seaborne, Bristol, both of United Kingdom

[73] Assignee: Hewlett-Packard Company, Palo Alto, Calif.

[21] Appl. No.: 09/091,061

[22] PCT Filed: Dec. 11, 1996

[86] PCT No.: PCT/GB96/03054

§ 371 Date: Jun. 9, 1998

§ 102(e) Date: Jun. 9, 1998

[87] PCT Pub. No.: WO97/31490

PCT Pub. Date: Aug. 28, 1997

[51] Int. Cl.[7] .................................................. G06F 17/30
[52] U.S. Cl. ....................................................... 707/10
[58] Field of Search ............................. 707/10; 709/201, 709/217, 229; 370/352, 353, 354, 410, 475

[56] References Cited

U.S. PATENT DOCUMENTS

| 4,659,877 | 4/1987 | Dorsey et al. | 379/88 |
| 5,351,276 | 9/1994 | Doll, Jr. et al. | 379/67 |

(List continued on next page.)

FOREIGN PATENT DOCUMENTS

| 0 654 930 A1 | 5/1993 | European Pat. Off. | H04M 3/42 |
| 0 654 930 | 5/1995 | European Pat. Off. | H04M 3/42 |
| WO 93/25035 | 12/1993 | WIPO | H04M 7/00 |
| WO 94/23523 | 10/1994 | WIPO | H04M 3/42 |
| WO 96/09714 | 3/1996 | WIPO | H04M 11/00 |
| WO 96/20553 | 7/1996 | WIPO | H04M 3/50 |
| WO 96/38018 | 11/1996 | WIPO | H04Q 11/64 |
| WO 97/16007 | 5/1997 | WIPO | H04L 12/66 |
| WO 97/20424 | 6/1997 | WIPO | H04M 3/42 |
| WO 97/26749 | 7/1997 | WIPO | H04M 3/54 |
| WO 97/32427 | 9/1997 | WIPO | H04M 2/00 |

OTHER PUBLICATIONS

T. Eckardt, et al., "On the Personal Communications Impacts on Multimedia Teleservices", *Technical University of Berlin*, 1994.

Swale, R., "Virtual Networks of the Future—Converging Public and Private IN", *BT Technology Journal*, 1993.

(List continued on next page.)

*Primary Examiner*—John E. Breene
*Assistant Examiner*—Robert Imreh

[57] ABSTRACT

A method of accessing a target entity over a communication network employs a distributed database system similar top the DNS of the Internet; indeed the DNS may be used as the required distributed database. The distributed database stores records, each associated with a corresponding domain name and holding communication data for use in accessing a target entity. Each of these domain names are related to a respective number string from which it can be derived by a process including parsing at least a substantial portion of the number string into at least a part of said domain name. Upon the input of a number indicative of a target entity, the related domain name is formed by parsing the number and the domain name is then used to retrieve the corresponding communication data from the DNS-type distributed database system. This data is then used in accessing the target entity. In one embodiment the communication network is a telephone network and the target entity is a called party; in this case, the number string comprises a dialed number and the retrieved communication data is a URI indicative of the location on the Internet of a current telephone number for the target party, the URI once retrieve being used to access the current telephone number over the Internet for use in setting up a call to the target party.

19 Claims, 14 Drawing Sheets

U.S. PATENT DOCUMENTS

| | | | |
|---|---|---|---|
| 5,423,003 | 6/1995 | Berteau | 395/200 |
| 5,438,568 | 8/1995 | Weisser, Jr. | 370/60 |
| 5,452,350 | 9/1995 | Reynolds et al. | 379/220 |
| 5,546,452 | 8/1996 | Andrews et al. | 379/219 |
| 5,703,940 | 12/1997 | Sattar et al. | 379/201 |
| 5,708,780 | 1/1998 | Levergood et al. | 395/200 |
| 5,799,317 | 8/1998 | He et al. | 707/104 |
| 5,873,077 | 2/1999 | Kanoh et al. | 707/3 |
| 6,021,126 | 2/2000 | White et al. | 370/352 |
| 6,023,724 | 2/2000 | Bhatia et al. | 709/218 |
| 6,026,441 | 2/2000 | Ronen | 709/227 |
| 6,029,203 | 2/2000 | Bhatia et al. | 709/244 |

OTHER PUBLICATIONS

Swale, et al., "Convergence of Public and Private IN", *BT Technology Journal*, 1992.

Swale, et al., "Distributed intelligence and data in public and private networks", *BT Technology Journal*, vol. 2, Apr. 1995.

"Web-On-Call Voice Browser Redefines Access to the Web", *The Netphonic Press Release*, Mar. 1996.

Atkins, et al., "Integrated Web and Telephone Service Creation", *Bell Labs Technical Journal*, 1997, pp.19–35.

Esaki, et al., "Abstraction and Control of Transport Network Resources for Intelligent Networks", *Electronics and Communications in Japan, Part 1: Communications*, vol. 76, No. 1, 1993, pp. 949–958.

Chang, et al., "Rapid Deployment of CPE–Based Telecommunications Services", *IEEE Globecom*, vol. 2, Nov. 1994.

Yang, et al., "The Design and Implementation of a Service Logic Execution Environment Platform", *Globecom '93*, vol. 3, Nov. 1993.

Berners–Lee, et al, "Hypertext Transfer Protocol—HTTP/ 1.0", *HTTP Working Group Internet Draft*, Oct. 1995.

P. Mockapetris, "Domain Names—Concepts and Facilities", *RFC 1034—Network Working Group*, Nov. 10987.

Comer, D.E., "Internetworking With TCP/IP vol. 1: Principles, Protocals, and Architecture," N.J., Prentice–Hall, Inc., 1991. pp. 329–330.

Mach2 DNS (Domain Name Services) Module (Jun. 13, 1995), Au–A–11045/97 Citation b.

Muffett, A., "Proper Care and Feeding of Firewalls," Sun Microsystems, UK (Nov. 14, 1994) pp. 1–12.

Swale, R.P., et al., "Virtual Networks of the Future—Converging Public and Private IN," *The Institution of Electrical Engineers*, pp. 6/1–6/5 (Oct. 1993).

Swale, R.P., et al., "Distributed Intelligence and Data in Public and Private Networks,"*BT Technology Journal*, vol.13 No.2, pp. 94–104 (Apr. 1995).

Yang, Che Liang, et al., "The Design and Implementation of a Service Logic Execution Environment Platform," *IEEE*, pp. 1911–1917 (Nov. 1993).

Berners–Lee, Tim, "Hypertext Transfer Protocol—HTTP/ 1.0," HTTP Working Group Internet Draft (Oct. 14, 1995).

Chang, Wan–Teh, et al., "Rapid Deployment of CPE–based Telecommunications Services," *IEEE*, pp. 876–880 (1994).

Eckardt, T., et al., "On the Personal Communications Impacts on Multimedia Teleservices," Multimedia: Advanced Teleservices and High–Speed Communication Architectures, International Workshop, (Apr. 26, 1994).

Esaki, Shuji, et al.,"Abstraction and Control of Transport Network Resources for Intelligent Networks," *Electronics and Communications in Japan*, Part 1, vol. 76, No. 1, pp. 34–44 (Jan. 1993).

Mockapetris, P., "Domain Names—Concepts and Facilities," RFC 1034 (DNS) (Nov. 1987).

Swale, R.P., et al., "Convergence of Public and Private IN," *BT Laboratories*, pp. 216–221 (Mar. 1992).

http : //www.hp.com/Products.htlm
\\_\_/ \_____/ \_____/
SCHEME     HOST LOCATION        ABSOLUTE PATH

METHOD OF ACCESSING A TARGET ENTITY OVER A COMMUNICATIONS NETWORK

FIELD OF THE INVENTION

The present invention relates to a method of accessing a target entity over a communications network. The present invention finds particular application to the provision of IN (Intelligent Network) services in a switched telecommunications system.

As used herein, the term "switched telecommunication system" means a system comprising a bearer network with switches for setting up a bearer channel through the network. The term "switched telecommunication system" is to be taken to include not only the existing public and private telephone systems (whether using analogue phones or ISDN-based), but also broadband (ATM) and other switch-based bearer networks that are currently being implemented or may emerge in the future. For convenience, the term "switched telecommunication system" is sometimes shortened herein to telecommunication system.

Reference to a "call" in the context of a switched telecommunication system is to be understood as meaning a communication through a bearer channel set up across the bearer network, whilst references to call setup, maintenance and takedown are to be taken to mean the processes of setting up, maintaining and taking down a bearer channel through the bearer network. Terms such as "call processing" and "call handling" are to be similarly interpreted.

The term "communication system" when used herein should be understood as having a broader meaning than switched telecommunication system, and is intended to include datagram-based communication systems where each data packet is independently routed through a bearer network without following a predetermined bearer channel.

BACKGROUND OF THE INVENTION

Telecommunication companies running PSTNs (Public Switched Telephone Networks) and PLMNs (Public Land Mobile Networks) are in the business of providing communication services and in doing so are providing increasing built-in intelligence in the form of "IN services" such as 800 number services and call forwarding. In contrast, the World Wide Web (WWW), which has seen explosive growth in recent times, is an example of an Internet-based global network providing complex information services. These two worlds, that of the large communications utilities and that of the highly dynamic, pioneer-spirit WWW information culture, are uneasy companions and each plans to encroach on the domain previously occupied by the others; thus telephony services will be offered over the WWW and information services over the public communication infrastructure.

The present invention proposes technologies for a more synergetic relationship between these two worlds than is currently envisaged and in order to place the present invention in context, a review will first be given of each of these two worlds.

Telephone Networks with IN Services

The Basic PSTN. The basic service provided by a PSTN (Public Switched Telephone Network) is the interconnection of two telephones (that is, setting up a bearer channel between the telephones) according to a called-party telephone number input at the calling-party telephone. FIG. 1 is a simplified representation of a PSTN providing such a service. In particular, customer premises equipment, CPE, 10 (such as standard analogue telephones, but also more recently ISDN terminals) are connected through an access network 11 to switching points, SPs 12. The SPs 12 form nodes in an inter-exchange network 13 made up of interconnecting trunks 14 and SPs that are controlled by control entities 15 in the SPs. The control effected by the control entities 15 is determined by signalling inputs received from the CPEs and other SPs, and involves call setup, maintenance and clearance to provide the desired bearer channel between calling CPE and called CPE. Conceptually, the PSTN may be thought of as a bearer network and a control (signalling) network, the function of the latter being to effect call control through the bearer network, namely the control of setup, maintenance and take down of bearer channels through the bearer network; in practice, the bearer and signalling networks may use the same physical circuits and even the same logical channels.

Thus, where the CPE is a traditional dumb telephone, control signalling between the CPE and its local SP is in-band signalling, that is, the signalling is carried on the same channel as used for voice; this signalling is interpreted and converted at the SPs 12 into signalling between SPs that uses a dedicated common-channel signalling network 16 (implemented nowadays using the SS7 protocol suite). Where the CPE is an ISDN terminal, signalling is carried in a separate channel directly from the CPE on an end-to-end. Modern SPs use the ISUP (ISDN User Part) SS7 protocol for inter-exchange call control signalling whether the CPE is a standard telephone or an ISDN terminal.

Telephone Numbering Plans—As certain aspects of the present invention are influenced by the structuring of telephone numbers, a brief description will now be given of the structuring of such numbers. Telephone numbers form an international, hierarchical addressing scheme based on groups of decimal digits. The top level of the hierarchy is administered by the ITU-T, which has allocated single-digit numeric codes to the major geographic zones (for example "1" for North America, "2" for Africa, "3" for Europe, "4" for Europe, "5" for South America and Cuba, etc.). Within each zone countries are assigned 2 or 3 digit codes, so that within zone 3 France is "33", and within zone 4 the UK is "44". Administration of the numbering plan within a country is delegated to a national body, such as the Office of Telecommunications ("Oftel") in the UTK. The following further description is based on the UK numbering plan, but the scheme described will be recognised as having widespread applicability.

In the UK all national numbers are prefixed by a code from 01 to 09 (the '0' prefix is dropped in international dialling). The currently assigned codes are "01" for Geographic Area Codes, "02" for Additional Geographic Area Codes, "04" for Mobile Services, "07" for Personal Numbers, and "08" for Special Service (freephone, information). Normal wireline PSTN subscriber telephone numbers are allocated from the Geographic Area Code codes, and currently only codes prefixed by 01 are allocated. Geographic area codes are presently 3 or 4 digits (excluding the leading '0') and there are currently 638 geographic areas each with its own code. A full national UK dialled number takes two forms:

| 0 | 171 | 634 8700 |
|---|---|---|
|   | area code | local number (7 digit) |
| 0 | 1447 | 456 987 |
|   | area code | local number (6 digit) |

The first case has the '0' prefix, a 3 digit area code and a 7 digit local number, and the second case has the '0' prefix, a 4 digit area code, and a 6 digit local number. Further interpretation of the local number will take place within the area exchange, as even a 6 digit address space is too large for a single switch, and for a typical local area several switches may be needed to host the required number of subscriber lines. This interpretation is opaque and is a matter for the area service provider.

In the current PSTN the inherently hierarchical and geographic interpretation of telephone numbers is mirrored by the physical architecture of the network. A telephone number is structured in a way that makes it easy to route a call through the network. At each step, the prefix of the number provides information about the current routing step, and the suffix (perhaps opaquely) provides information about subsequent routing steps; as long as a switch knows how to parse a prefix and carry out a routing step, it does not need to understand the content of the suffix, which is left for subsequent routing steps. For this reason the international and national switching fabric is also organised hierarchically.

Intelligent Networks. Returning now to a consideration of the current telephone network infrastruture, in addition to basic call handling, an SP may also serve to provide what are called IN (Intelligent Network) services; in this case the SP is termed a service switching point, SSP. An SSP 25 is arranged to suspend call processing at defined points-in-call upon particular criteria being met, and to delegate the continuation of call processing to a service control subsystem providing a service control function (SCF) either in the form of a service control point, SCP 17 (see FIG. 2) or an Adjunct 18. The Adjunct 18 is directly associated with an SSP 25 whilst the SCP 17 and SSP 25 communicate with each other via an extended common channel signalling (CCS) network 16 that may include signal transfer points (STP) 19. The SCP 17 may be associated with more than one SSP 25. Both the SCP 17 and Adjunct 18 provide a service logic execution environment (STEE) 20 in which instances of one or more service logic programs (SLP) 21 can execute. The SLEE 20 and SLP 21 together provide service control functionality for providing services to the SSP 25.

Service logic running in an SCP or Adjunct will generally make use of subscriber information stored in a service data function (SDF) 22 that may be integral with the SCP/Adjunct or partially or wholly separate therefrom. The service data function (SDF), like the service control function (SCF) forms part of the service control subsystem of the PSTN. It may be noted that some or all of the service control function may be built into the PSTN switches themselves.

In addition to the SCP 17 and Adjunct 18, the FIG. 2 network includes an intelligent peripheral (IP) 23. The IP 23 provides resources to the SSP 25 such as voice announcements and DTMF digit collection capabilities. The network will also include an operation system (not shown) that has a general view of the network and its services and performs functions such as network monitoring and control.

In operation, when the SSP 25 receives a call, it examines internal trigger conditions and, possibly, user information (eg dialled digits) to ascertain if the call requires a service to be provided by the service control subsystem 17, 18; the checking of trigger conditions may be carried out at several different points in call processing. Where the SSP 25 determines that a service is required it messages the service control subsystem (either SCP 17 or Adjunct 18) requesting the desired service and sending it a logic representation of the call in terms of its connectivity and call processing status. The service control subsystem then provides the requested service and this may involve either a single interaction between the SSP and service control subsystem or a session of interactions. A typical service is call forwarding which is a called-party service giving expression to an end-user requirement as simple as "if you call me on number X and it rings ten times, try calling number Y". In this case, it is the SSP local to the called end-user that triggers its associated SCP (or Adjunct) to provide this service; it will, of course, be appreciated that the SSP must be primed to know that the service is to be provided for a called number X.

The above-described model for the provision of IN services in a PSTN can also be mapped onto PLMNs (Public Land Mobile Networks) such as GSM and other mobile networks. Control signalling in the case of a mobile subscriber is more complex because in addition to all the usual signalling requirements, there is also a need to establish where a call to a mobile subscriber should be routed; however, this is not a very different problem from a number of called-party IN services in the PSTN. Thus in GSM, the service data function (SDF) is largely located in a system named a Home Location Register (HLR) and the service control function in a system named a Visitor Location Register (VLR) that is generally associated on a one-to-one basis with each SSP (which in GSM terminology is called a Mobile Switching Centre, MSC).

Because subscribers are mobile, the subscriber profile is transported from the HLR to whichever VLR happens to be functionally closest to be mobile subscriber, and from there the VLR operates the (fixed) service using the subscriber profile and interacts with the SSP. The HLR and VLR thus constitute a service control subsystem similar to an SCP or Adjunct with their associated databases.

It is, of course, also possible to provide IN services in private telephone systems and, in this case, the service control function and service data function are generally either integrated into a PABX (Private Automatic Branch Exchange) or provided by a local computer. The service control subsystem, whilst present, may thus not be a physically distinct from the PABX.

The above-described general architectural framework for providing IN services has both strengths and flaws. Its main strength is that it works and many services have been successfully deployed, such as 800 number services, credit card calling, voicemail, and various call waiting and redirection services. However, despite years of standardisation, services are still implemented one-at-a-time on proprietary platforms and do not scale well. The approach has been based on large, fault-tolerant systems which provide services for hundreds of thousands or even millions of subscribers and take years to deploy. Furthermore, since the networks used to support these services also constitute the basic telephone infrastructure, anything attached to these networks must be rigorously vetted. Additionally, each country and operator tends to have local variations of the so-called standards making it difficult to supply standard products and thereby braking the dynamics of competition.

The World Wide Web

In contrast to the slow deliberate progress of the telephone infrastructure, the WWW has grown explosively from its inception in 1989 to become the primary electronic information distribution service in terms of spread, availability and richness of information content. Anyone can, for a modest outlay, become an information provider with a world-wide audience in a highly interconnected information architecture.

The WWW is a client-server application running over the Internet and using a client-server protocol which mandates only the simplest of exchanges between client and server. This protocol is HTTP (Hyper Text Transfer Protocol) which is optimised for use over TCP/IP networks such as the Internet; the HTTP protocol can, however, also be used over networks using different communication protocol stacks.

Since the availability of literature concerning the WWW has seen the same sort of growth as the WWW itself, a detailed description of the WWW, HTTP and the Internet will not be given herein. An outline description will, however, be given with attention being paid to certain features of relevance to the present invention.

The WWW uses the Internet for interconnectivity Internet is a system that connects together networks on a worldwide basis. Internet is based on the TCP/IP protocol suite and provides connectivity to networks that also use TCP/IP. For an entity to have a presence on the Internet, it needs both access to a network connected to the Internet and an IP address. IP addresses are hierarchically structured. Generally an entity will be identified at the user level by a name that can be resolved into the corresponding IP address by the Domain Name System (DNS) of the Internet. Because the DNS or adaptions of it are fundamental to at least certain embodiments of the invention described hereinafter, a description will next be given of the general form and operation of the DNS.

The Domain Name System—The DNS is a global, distributed, database, and without its performance, resilience and scalability much of the Internet would not exist in its current form. The DNS, in response to a client request, serves to associate an Internet host domain name with one or more Registration Records (RR) of differing types, the most common being an address (A) record (such as 15.144.8.69) and mail exchanger (MX) records (used to identify a domain host configured to accept electronic mail for a domain). The RRs are distributed across DNS name servers world-wide, these servers cooperating to provide the domain name translation service; no single DNS server contains more than a small part of the global database, but each server knows how to locate DNS servers which are "closer" to the data than it is. For present purposes, the main characteristics of the DNS of interest are:

The host name space is organised as a tree-structured hierarchy of nodes with each host having a corresponding leaf node; each node has a label (except the root node) and each label begins with an alphabetic character and is followed by a sequence of alphabetic characters or digits. The full, or "fully qualified" name of a host is the string of node labels, each separated by a ".", from the corresponding leaf node to the root node of the hierarchy, this latter being represented by a terminating "." in the name. Thus a host machine "fred" of Hewlett-Packard Laboratories in Bristol, England will have a fully qualified domain name of "fr-d.hpl.hp.com." (note that if a host name does not have a terminal "." it is interpreted relative to the current node of the naming hierarchy).

Each host has one or more associated Registration Records (RRs).

There are a plurality of DNS servers each with responsibility for a subtree of the name space. A DNS server will hold RRs for all or part of its subtree—in the later case it delegates responsibility for the remainder of the subtree to one or more further DNS servers. A DNS server knows the address of any server to which it has delegated responsibility and also the address of the server which has given it the responsibility for the subtree it manages. The DNS servers thus point to each other in a structuring reflecting that of the naming hierarchy.

An application wishing to make use of the DNS does so through an associated "resolver" that knows the address of at least one DNS server. When a DNS server is asked by this resolver for an RR of a specified host, it will return either the requested RR or the address of a DNS server closer to the server holding the RR in terms of traversal of the naming hierarchy. In effect, the hierarchy of the servers is ascended until a server is reached that also has responsibility for the domain name to be resolved; thereafter, the DNS server hierarchy is descended down to the server holding the RR for the domain name to be resolved.

The DNS uses a predetermined message format (in fact, it is the same for query and response) and uses the IP protocols.

These characteristics of the DNS may be considered as defining a "DNS-type" system always allowing for minor variations such as in label syntax, how the labels are combined (ordering, separators), the message format details, evolutions of the IP protocols etc.

Due to the hierarchical naming structure, it is possible to delegate responsibility for administering domains (subtrees) of the name space recursively. Thus, the top-level domains are administered by InterNic (these top-level domains include the familiar 'com', 'edu', 'org', 'int', 'net', 'mil' domains as well as top-level country domains specified by standard two-letter codes such as 'us', 'uk', 'fr' etc.). At the next level, by way of example Hewlett-Packard Company is responsible for all names ending in 'hp.com' and British Universities are collectively responsible for all names ending in 'ac.uk'. Descending further, and again by way of example, administration of the domain 'hpl.hp.com' is the responsibility of Hewlett-Packard Laboratories and administration of the subtree (domain) 'newcastle.ac.uk' is the responsibility of the University of Newcastle-upon-Tyne.

FIG. 3 illustrates the progress of an example query made from within Hewlett-Packard Laboratories. The host domain name to be resolved is 'xy.newcastle.ac.uk', a hypothetical machine at the University of Newcastle, United Kingdom. The query is presented to the DNS server responsible for the "hpl.hp.com" subtree. This server does not hold the requested RR and so responds with the address of the "hp.com" DNS server; this server is then queried and responds with the address of the 'corn' DNS server which in turn responds with the address of the '.' (root) DNS server. The query then proceeds iteratively down the 'uk' branch until the 'newcastle.ac.uk' server responds with the RR record for the name 'xy' in its subtree.

This looks extremely inefficient, but DNS servers are designed to build a dynamic cache, and are initialised with the addresses of several root servers, so in practice most of the iterative queries never take place. In this case the 'hpl.hp.com' DNS server will know the addresses of several root servers, and will likely have the addresses of 'uk' and 'ac.uk' servers in its cache. The first query to the 'hpl.hp.com' server will return the address of the 'ac.uk' server. The second query to the 'ac.uk' server will return the address of the 'newcastle.ac.uk' server, and the third query will return the RR in question. Any future queries with a 'newcastle.ac.uk' prefix will go direct to the newcastle DNS server as that address will be retained in the "hpl.hp.com" DNS server cache. In practice names within a local subtree are resolved in a single query, and names outside the local subtree are resolved in two or three queries.

Rather than a resolver being responsible for carrying out the series of query iterations required to resolve a domain name, the resolver may specify its first query to be recursive in which case the receiving DNS server is responsible for resolving the query (if it cannot directly return the requested RR, it will itself issue a recursive query to a 'closer' DNS server, and so on).

It should also be noted that in practice each DNS server will be replicated, that is, organised as a primary and one or more secondaries. A primary DNS nameserver initialises itself from a database maintained on a local file system, while a secondary initialises itself by transferring information from a primary. A subtree will normally have one primary nameserver and anything up to ten secondaries—the limitation tends to be the time required by the secondaries to update their databases from the primary. The primary database is the master source of subtree information and is maintained by the domain DNS administrator. The secondaries are not simply standby secondaries but each actively participates in the DNS with dependent servers that point to it rather than to the corresponding primary.

DNS implementations, such as BIND, are widely available as a standard part of most UNIX systems, and can claim to be among the most robust and widely used distributed applications in existence.

Operation of the WWW Referring now to FIG. 4 of the accompanying drawings, access to the Internet 30 may be by direct connection to a network that is itself directly or indirectly connected to the Internet; such an arrangement is represented by terminal 31 in FIG. 4 (this terminal may, for example, be a Unix workstation or a PC). Having a connection to the Internet of this form is known as having 'network access'. Any entity that has network access to the Internet may act as a server on the Internet provided it has sufficient associated functionality; in FIG. 4, entity 32 with file store 37 acts as a server.

Many users of the WWW do not have network access to the Internet but instead access the Internet via an Internet service provider, ISP, 33 that does have network access. In this case, the user terminal 34 will generally communicate with the ISP 33 over the public telephone system using a modem and employing either SLIP (Serial Line Interface Protocol) or PPP (Point-to-Point Protocol). These protocols allow Internet packets to traverse ordinary telephone lines. Access to the Internet of this form is known as "dialup IP" access. With this access method, the user terminal 34 is temporarily allocated an IP address during each user session; however, since this IP address may differ between sessions, it is not practical for the entity 34 to act as a server.

A cornerstone of the WWW is its ability to address particular information resources by means of an Uniform Resource Identifier (URI) that will generally be either a Uniform Resource Locator (URL) that identifies a resource by location, or a Uniform Resource Name (URN) that can be resolved into an URL. By way of example, a full or "absolute" URL will comprise the following elements:

scheme—this is the access scheme to be used to access the resource of interest;

host—the Internet host domain name or IP address;

port—the host port for the (TCP) connection;

abs-path—the absolute path of the resource on the host.

In fact, the 'port' may be omitted in which case port 80 is assumed.

FIG. 5 of the accompanying drawings shows an example URL for the Hewlett-Packard products welcome page. In this case, the elements are:

scheme—http host—www.hp.com port—omitted (port 80 assumed)

abs-path—Products.html

The HTTP protocol is based on a request/response paradigm. Referring again to FIG. 4 of the drawings, given a particular URI identifying a resource 30 to be accessed, a client establishes a connection with the server 31 corresponding to the "host" element of the URI and sends a request to the server. This request includes a request method, and the "Request-URI" (which is generally just the absolute path of the resource on the server as identified by the "abs-path" element of the URI); the request may include additional data elements. The server 31 then accesses the resource 36 (here held on storage 37) and responds and this response may include an entity of a type identified by a MIME (Multipurpose Internet Mail Extensions) type also included in the response.

The two main request methods are:

GET—This method results in the retrieval of whatever information (in the form of an entity) is identified by the Request-URI. It is important to note that if the Request-URI refers to a data-producing process, it is the produced data which is returned as the entity in the response and not the source text of the process.

POST—This method is used to request that the destination server accept the entity enclosed in the request as a new subordinate of the resource identified by the Request-URI. The POST method can be used for annotation of existing resources, providing a message to a bulletin board, providing data to a data-handling process (for example, data produced as the result of submitting a form), and extending a database through an append operation.

In summary, the GET method can be used to directly retrieve data, or to trigger any process that will return an entity (which may either be data or a simply an indication of the result of running the process). The POST method is used for registering data and specifying this method is also effective to trigger a process in the server to handle the posted data appropriately.

The passing of information to a process triggered to run on a server using either the GET or POST method is currently done according to an interface called the Common Gateway Interface (CGI). The receiving process is often written in a scripting language though this is not essential. Typically, the triggered server script is used for interfacing to a database to service a query included in a GET request. Another use, already referred to, is to append data associated with a POST request to a database.

Other important factors in the success of the WWW is the use of the HyperText Markup Language (HTML) for representing the makeup of documents transferred over the WWW, and the availability of powerful graphical Web browsers, such as Netscape and Mosaic, for interpreting such documents in a client terminal to present them to a user. Basically, HTML is used to identify each part of a document, such as a title, or a graphic, and it is then up to the browser running in the client terminal to decide how to display each document part. However, HTML is more than this—it also enables a URI and a request method to be associated with any element of a document (such as a particular word or an image) so that when a user points to and clicks on that element, the resource identified by the URI is accessed according to the scheme (protocol) and request method specified. This arrangement provides a hyperlink from one document to another. Using such hyperlinks, a user at a client terminal can skip effortlessly from one document downloaded from a server on one side of the world, to another document located on a server on the other side of the world. Since a document created by one author may include a hyperlink to a document created by another, an extremely powerful document cross-referring system results with no central bureaucratic control.

Hyperlinks are not the only intelligence that can be built into an HTML document. Another powerful feature is the ability to fill in a downloaded "Form" document on screen and then activate a 'commit' graphical button in order to have the entered information passed to a resource (such as a database) designed to collect such information. This is achieved by associating the POST request method with the 'commit' button together with the URI of the database resource; activating the 'commit' button results in the entered information being posted to the identified resource where it is appropriately handled.

Another powerful possibility is the association of program code (generally scripts to be interpreted) with particular documents elements, such as graphical buttons, this code being executed upon the button being activated. This opens up the possibility of users downloading program code from a resource and then running the code.

It will be appreciated by persons skilled in the art that HTML is only one of several currently available scripting languages delivering the functionality outlined above and it may be expected that any serious Web browser will have built-in support for multiple scripting languages. For example, Netscape 2.0 supports HTML 3.0, Java and LiveScript (the latter being Netscape proprietary scripting Language).

The importance of the role of the graphical Web browser itself should not be overlooked. As well as the ability to support multiple scripting languages, a Web browser should provide built-in support for standard media types, and the ability to load and execute programs in the client, amongst other features. These browsers may be viewed as operating systems for WWW interaction.

WWW and the Telephone Network

It is possible to provide a telephony service over the Internet between connected terminals by digitising voice input and sending it over the Internet in discrete packets for reassembly at the receiving terminal. This is an example of a communication service on the Internet. Conversely, it is possible to point to a variety of information services provided over the telephone system, such as the Minitel system widely available in France. However, these encroachments into each anothers traditional territories pose no real threat to either the Internet or the public telephone system.

Of more interest are areas of cooperative use of the Internet and the telephone system. In fact, one such area has existed for some considerable time and has been outlined above with reference to FIG. 4, namely the use of a modem link over the PSTN from a user computer 34 to an Internet service provider 33 in order to obtain dialup IP access to the Internet. This cooperative use is of a very simple nature, namely the setting up of a bearer channel over the PSTN for subsequently generated Internet traffic; there is no true interaction between the Internet and the PSTN.

Another known example of the cooperative use of the Internet and PSTN is a recently launched service by which an Internet user with a sound card in his/her terminal computer can make a voice call to a standard telephone anywhere in the world. This is achieved by transferring digitised voice over the Internet to a service provider near the destination telephone; this service provider then connects into the local PSTN to access the desired phone and transfers across into the local PSTN the voice traffic received over the Internet. Voice input from the called telephone is handled in the reverse manner. Key to this service is the ability to identify the service provider local (in telephony charging terms) to the destination phone. This arrangement, whilst offering the prospect of competition for the telecom operators for long distance calls, is again a simple chaining together of the internet and PSTN. It may, however, be noted that in this case it is necessary to provide at least a minimum of feedback to the Internet calling party on the progress of call set to the destination telephone over the PSTN local to that telephone; this feedback need only be in terms of whether or not the call has succeeded.

From the foregoing it can be seen that the current cooperative use of the Internet and telephone system is at a very simple level.

It is an object of the present invention to provide a method of accessing a target entity over a communications network that facilitates the integration of the PSTN and the WWW.

SUMMARY OF THE INVENTION

According to one aspect of the present invention, there is provided a method of accessing a target entity over a communications network, said method comprising the steps of:

(a)—providing a DNS-type distributed database system storing records each associated with a corresponding domain name and holding communication data for use in accessing a target entity, each domain name being related to a respective number string from which it can be derived by a process including parsing at least a substantial portion of the number string into at least a part of the domain name;

(b)—supplying a number string indicative of a target entity and forming the related domain name by said process including parsing at least a substantial part of the number string into at least a part of a domain name;

(c)—applying the domain name formed in step (b) to the DNS-type distributed database system to retrieve the communication data held in the corresponding record; and (d)—using the communication data retrieved in step (c) in accessing the target entity.

In one application, the communications network is a telephone network and the target entity is a called party. In this case, the number string may comprise a dialed number and the retrieved communication data may be a current telephone number for the target party. Alternatively, the retrieved communication data may be a URI indicative of the location on a computer network of a current telephone number for the target party, said URI being thereafter used to retrieve this current telephone number for use in accessing the target party.

In another application, the communications network is a computer network and the target entity is a resource item held at a corresponding URI on that network. In this case, the number string may comprise a telephone number for the target party and the retrieved communication data may be the URI of the target resource item. This target resource item is, for example, a current telephone number of a target party it is wished to call, said number string being a personal telephone number for that target party. More generally, the resource item may be:

downloadable data which upon being accessed is intended to be downloaded to the accessing entity;

downloadable service logic which upon being accessed is intended to be downloaded to the accessing entity for execution thereby.

service logic intended to be executed in place upon being accessed with the result of this execution being returned to the accessing entity;

As regards the parsing of said at least a substantial part of the number string into at least a part of a domain name, this can be done by dividing said substantial portion into label segments according to a division scheme which is the same for all number strings. However, where the number string is an international telephone number, the parsing of this number preferably involves forming a label segment of the country code component of the international telephone number and then forming further label segments from the remainder of the international telephone number according to a division scheme the same for all such numbers. As an alternative, the forming of the further label segments from the remainder of the international telephone number can be effected according to a division scheme that is dependent on the identity of said country code component.

The DNS-type distributed database system is adapted to handle a set of domain names that make up a name space herein referred to as the "telname space". In one arrangement, the root of the telname space is the root of the overall name space handled by the DNS-type distributed database system. However, in a preferred implementation, the DNS-type distributed database system is provided by the DNS of the Internet and in this case the telname space may be provided by one or more subdomains of the DNS. For example, where the number strings are telephone numbers, the telname space may form a "tel" subdomain in the domain .itu.int. of the DNS; alternatively, the telname space may be provided by respective subdomains in at least some of the country domains of the DNS.

Where the telname space is a subdomain of a larger name space, a predetermined part of the number string may be used to look up a domain name tail corresponding to the root of the telname space in the larger name space. This domain name tail is then added to the domain name part derived by said parsing of at least a substantial portion of the number string. Thus, where the number string is an international telephone number and the telname space is split between country subdomains, the country code component can be used to look up the domain name tail corresponding to the appropriate subdomain.

BRIEF DESCRIPTION OF THE DRAWINGS

Embodiments of the present invention will now be described, by way of non-limiting example, with reference to the accompanying diagrammatic drawings, in which.

BEST MODE OF CARRYING OUT THE INVENTION

Figure 6:
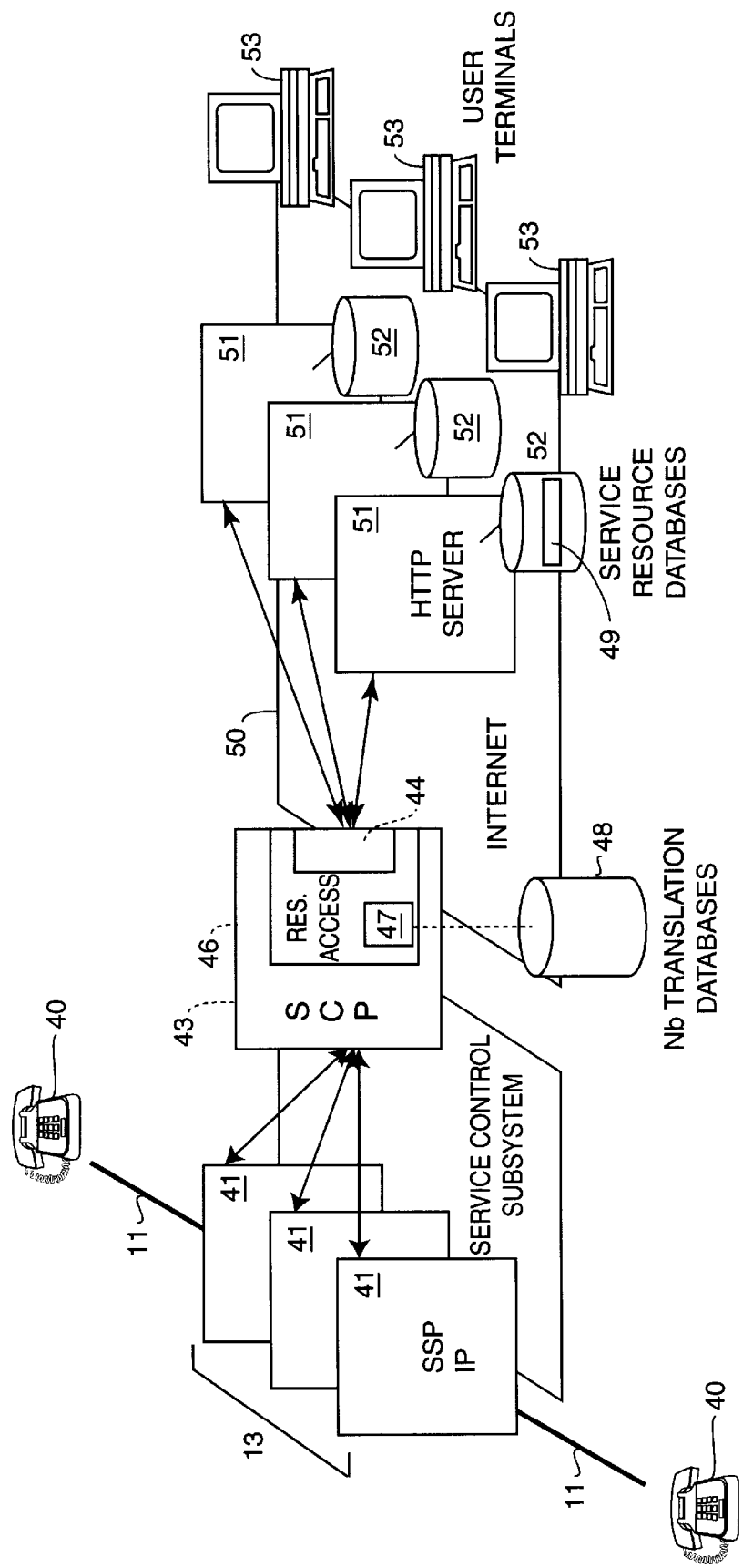
FIG. 6 is a diagram of a first arrangement in which service resource items are held on HTTP servers accessible both by the service control subsystem of a PSTN and by Web users.

FIG. 6 illustrates an arrangement for the provision of services in a PSTN conventionally comprising an inter-exchange network 13 (including trunks and switches at least some of which are SSPs 41 with associated EPs), an access network 11 connecting customer permise equipment (here shown as telephones 40) to the network 13, and a service control subsystem 42 including at least one SCP for providing services to the SSPs 41 upon request. It will be appreciated that the FIG. 6 representation of a PSTN is highly diagrammatic.

The SCP 43 may operate in a conventional manner responding to service requests from SSPs 41 to run specific service logic on particular data according to information contained in the service request, and to send back to the requesting SSP appropriate instructions for effecting call set up. A service request is generated by the SSP in response to predetermined trigger conditions being met at a trigger check point, there being one or more such check points in the course of handling a call (it may be noted that where the trigger conditions have been downloaded to the SSP from the SCP then it could be said that the SSP is responding to an information request by the SCP when contacting the SCP upon the trigger conditions being met—however, in the present specification, this initial communication from the SSP to the SCP will be referred to as a "service request").

The SCP 43 is also provided with a network access interface 44 to the Internet 50 in order to make use of certain service resource items 49 (also referred to below simply as "service resources") during the course of processing at least certain service requests from the SSPs 41. These service resources 49 are held as WWW pages on HTTP servers 51 (more particularly, on service resource databases 52 of these servers 51). The WWW pages containing these service resources are referred to below as "phone" pages. The servers 51 are connected to the Internet and the phone pages are read accessible using respective URLs or URNs (for convenience, the more general term URI will be used hereinafter to mean the Internet-resolvable indicator of the location of a phone page).

The service resources may be service logic or service data and may be used by an otherwise standard service logic program running on the SCP, by accessing the phone page of the required resource using the appropriate URI. In certain cases, the service resources 49 may provide substantially all of the service control and data associated with a particular service. In this case, the service logic program running in the SCP 43 is of skeleton form, being instantiated on receipt of a service request and then serving to initiate service resources access and to return the results of this access to the entity that made the service request. In fact, according to this approach, the SCP could be implemented simply as a platform for fetching and executing phone-page service logic and would not need to have the complex provisioning and management systems for such logic as is required by standard SCP platforms; SCPs could then become more ubiquitous, possibly being associated with every SSP.

Figure 7:
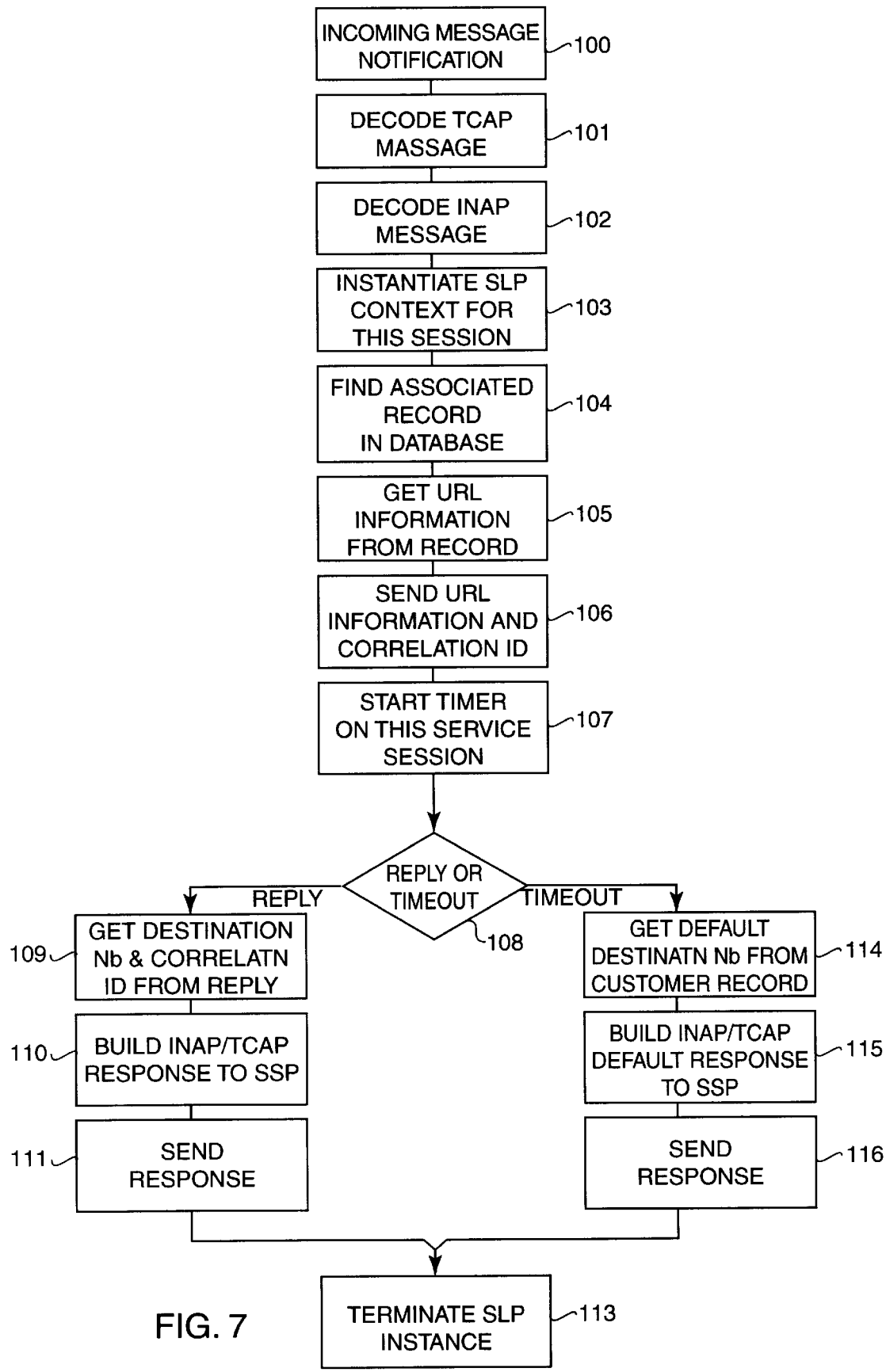
FIG. 7 is a diagram illustrating the processing of a service request by the SCP of FIG. 6.

FIG. 7 is a flow chart illustrating the progress of events in the case where the SCP 43 handles a service request by accessing a phone-page service resource. Upon receipt of a service request in an INAP message (step 100), SCP 43 decodes the TCAP/INAP message structure in standard manner (steps 101 and 102) well understood by persons skilled in the art. Next, SCP 43 instantiates a service logic program, SLP, to handle the request (step 103). This SLP is then responsible for looking up the URL of the required service resource as determined from information contained in the service request (steps 104, 105). For example, if the service request relates to a called-party service, then the required resource will be indicated by the dialled number and the latter will be used to derive the URL of the resource. Once the URL of the desired service resource has been ascertained, a resource request (for example, in the form of an HTTP request message) is sent over the Internet to the corresponding server holding the desired service resource (step 106); a correlation ID is also passed with the resource request to enable a response from the latter to be linked with the appropriate SLP instance. A timer is also started (step 107).

If a response is received from the accessed resource before the expiration of a time-out period (tested in step 108), then the response, which is usually in the form of a destination number, is supplied to the appropriate SLP as identified using the correlation ID passed with the response (step 109). An INAP/TCAP response message is then prepared and sent to the entity that made the original service request (steps 110 and 111) after which the SLP instance is terminated (113).

If in step 108, a time-out occurs before a response is received, then a default response value (generally a default destination number) may be looked up in the customer record and put in an INAP/TCAP message and sent back to the requesting entity (steps 114 to 116). The SLP instance is then terminated (113).

Locating & Accessing Service Resources

The functionality associated with accessing a phone-page resource is schematically represented in FIG. 6 by resource access block 46. Block 46 includes URI determination block 47 for determining the URI of the phone page containing the desired resource on the basis of parameters passed to block 46. Using the URI returned by block 47, the resource access block 46 then accesses the phone page of the required service resource 49 over the Internet through interface 44.

Resource Codes—It is possible that more than one service resource is associated with a particular telephone number; in this case the resource access block 46 will need to know additional information (such as current point-in-call, pic) to enable the appropriate service resource to be identified. If the service resources associated with a number are located on different phone pages, then the additional information is also passed to the URI determination block 47 to enable it to return the URI of the appropriate phone page. It is also possible for all the service resources associated with a number to be located on the same phone page. In this case, the resource access block 46 uses the additional information to pass a resource-identifying parameter with its access request to the phone page concerned; it is then up to the functionality associated with the phone page to access the correct service resource.

Figure 8:
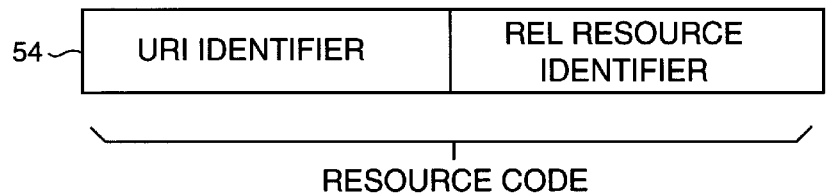
FIG. 8 is a diagram illustrating the format of a resource code used by the FIG. 6 SCP when accessing a service resource item.

Thus, each service resource can be considered as being identified by a respective resource code 54 (see FIG. 8) made up of a first part UI ("URI Identifier") used to identify the URI at which the resource is located on the Internet, and a second part RRI ("Relative Resource Identifier") used to identify the resource amongst plural resources at the same URI.

Figure 9:
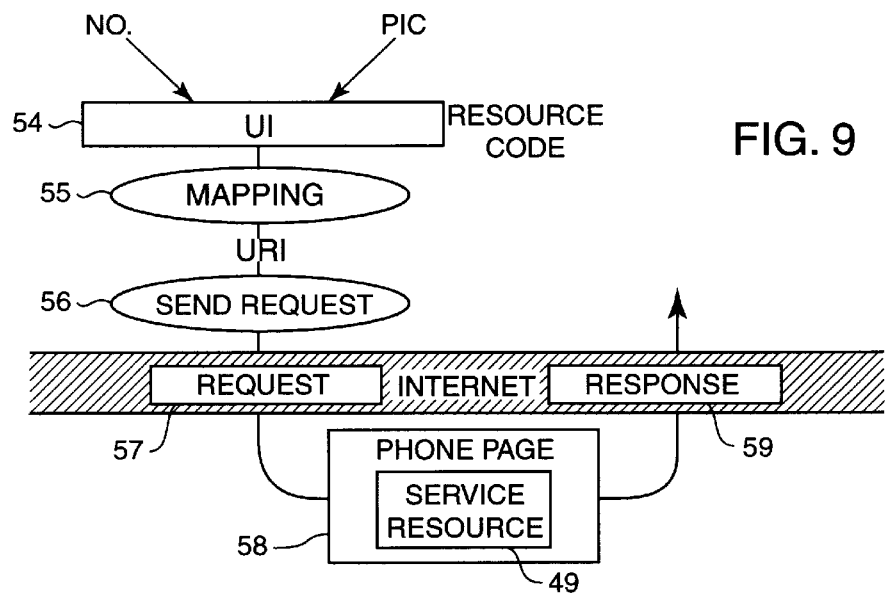
FIG. 9 is a diagram illustrating the process of accessing a service resource in the case where the service code does not include an RRI part.

Resource Access—Where only one service resource 49 is located on a phone page 58 identified by a unique URI, then the resource code 54 simply comprises the UI, generally either a telephone number alone or a telephone number plus a pic parameter (see FIG. 9). In this case, accessing a resource simply involves mapping the whole resource code 54 into the corresponding URI (process 55) and then sending a request 57 to the corresponding phone page 58, this latter itself constituting the desired service resource 49. The result of accessing resource 49 is then returned in response message 59.

In contrast, where multiple service resources 49 are located on the same phone page 58 (FIG. 10), the resource code 54 comprises both a UI and RRI, the UI generally being a telephone number and the RRI a pic or other parameter for distinguishing between the co-located resources. In this case, accessing a resource involves mapping the UI part of the resource code 54 into the corresponding URI (process 55) and then sending a request 57 to the corresponding phone page (process 56), the request including the RRI of the resource code. The phone page 58 includes functionality 64 for accessing the required resource on the basis of the RRI in the request message. The result of accessing the required resource 49 is then returned in response message 59.

Figure 10:
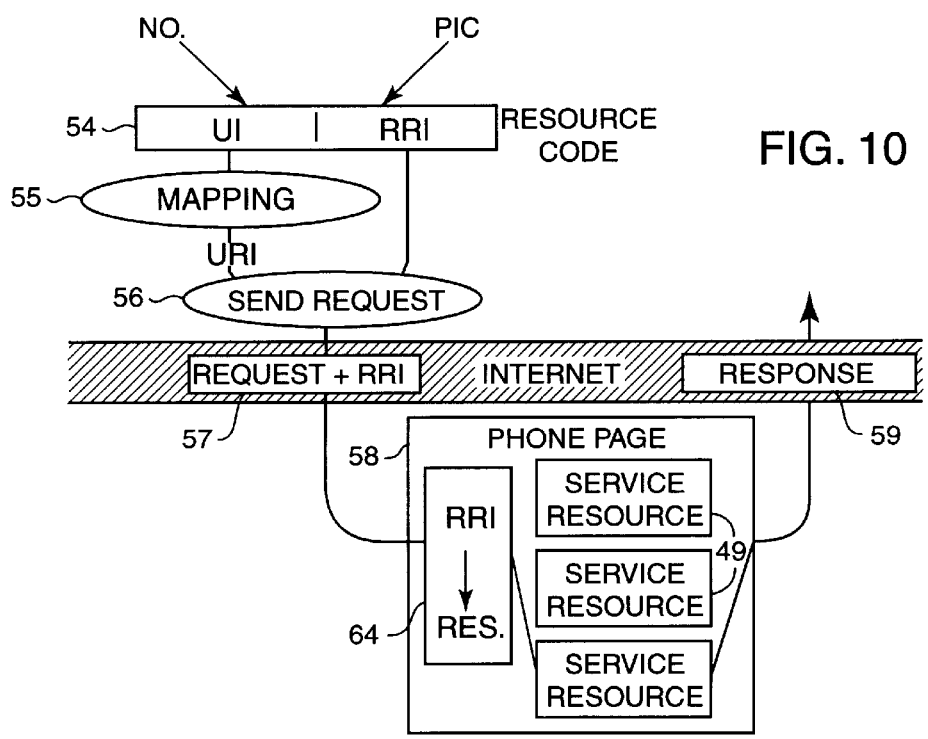
FIG. 10 is a diagram illustrating the process of accessing a service resource in the case where the service code includes an RRI part.

An alternative to the FIG. 10 method of accessing a service resource that is co-located with other resources on a phone page, would be to retrieve the whole page across the Internet simply using the URI derived from the UI part of the resource code, and then to extract the desired resource on the basis of the RRI.

URI Determination from Resource Code—The implementation of the URI determination block 47 that performs process 55 will next be considered. Block 47 may be implemented in a variety of ways, four of which are described below:

Direct Input

It would be possible, though not necessarily convenient, to arrange for the calling party to input directly the required URI. The calling party may thus input the host id component of the URI required (either in the form of a host domain name or host IP address) plus the path component of the URI. For example, in the case where the phone page of a called party is to be accessed, the calling party may input the URI of the called party and, indeed, this input may substitute for the normal input of a telephone number. A leading input string (for example "999") may be used to identify the input as an URI. As regards the input means, where a user only has a standard 12 key telephone, input of host domain names and other URI elements requiring alpha characters, will need to be done using one of the standard techniques for alpha input from a phonepad (such techniques are already used, for example, to enable a calling party to "spell" out the name of the called party). It would also be possible to provide users with a full alphanumeric keypad to facilitate URI input.

Computation

Service resource access over the Internet could be restricted to a set of dialled numbers from which it was possible to compute a corresponding URI; in this case, this computation would be the responsibility of block 47.

Association Table Lookup

Probably the simplest implementation for the block 47 is as an association table (either in memory or held on database disc store 48) associating a URI with the UI part of each resource code. A potential problem with this approach is that a service resource may be required for a called party number on the other side of the world which implies a rigorous update regime between PSTN operators worldwide in order to keep the association table up-to-date. (Note that the same implication is not necessarily applicable in respect of marking the called-party number as one required to trigger a service request, since the number may be arranged to be one of a group of numbers all triggering an appropriate service request, in a manner similar to 800 numbers).

NS-Type Lookup

An alternative lookup solution is to use a hierarchically-structured distributed database system, similar to (or even part of) the Domain Name System (DNS) of the Internet, in order to resolve the UI part of a resource code to a corresponding URI. This approach, which will be described in more detail below, would typically involve databases maintained by each PSTN operator for its numbers with which URIs are associated. These databases would be accessible by all PSTNs through a network such as the Internet with resolution requests being pointed to the appropriate database in a manner similar to the Domain Name System. In this case, the block 47 is constituted by an appropriate resolution program arranged to request UI resolution over the Internet through interface 44.

Before describing a DNS-type lookup implementation for the URI determination block 47, some further general comments are appropriate. Whatever method is used to determine the URI, certain simplifications are possible if limited constraints are placed on the URIs permitted. In particular, it is not necessary to determine all components of an URI in the following cases:

(i) A part of the URI path component can be made standard for all service resources, this standard part being simply added by the block 47 once the rest of the URI has been determined. For example, where a roaming number is to be looked up, it may by convention always be held in a file "roam" in a subdirectory "tel" of a subscriber's directory on a particular server. In this case the URI host component and the subscriber-unique part of the path component are first determined and then the remaining path part "/tel/roam" is added.

(ii) The URI path component can be arranged to be the same as a predetermined part of the resource code, the block 47 needing only to determine the host component and then add the path. For example, it may be agreed that the path must always end with the telephone number concerned, or sufficient of the terminating digits to have a high probability of uniqueness on the host machine. The path may also include standard components to be added by block 47.

(iii) Blocks of telephone numbers may have their corresponding service resources located on the same host server so that it is only necessary to use a part of the telephone number to determine the host component of the URI; in this case, the path component can conveniently include all or part of each telephone number. This situation implies a tight degree of control by the telephone operators and does not offer the telephone user the freedom to choose the host server on which user places their phone page.

Another general point worthy of note is that however the URI is determined, the host component of the URI may be provided either in the form of a host domain name or a host IP address. Where the host is identified by a domain name, then a further resolution of URI host name to IP address will subsequently be carried out in standard manner by interface 44 using the Domain Name System of the Internet. This further resolution can be avoided if the host identity is directly provided as an IP address.

Where a database lookup is used to provide the number to URI translation, this database may be independent of, or combined with, a customer database containing other customer-related information. Factors affecting this choice include, on tile one hand, the possible desirability of having the number-to-URI translation information widely available, and on the other hand, the possible desirability of restricting access to other customer-related information.

DNS-Type URI Lookup

A DNS-type lookup implementation for the URI determination block 47 will now be described in some detail for the case where the UI part of the resource code is a telephone number and there are no constraints on the URI, thereby requiring both the full host and path components of the URI to be returned by the lookup. A key part of the overall process is the formation of the equivalent of a host domain name from the telephone number of interest; this domain-name equivalent is then resolved into a corresponding URI by a lookup mechanism which in the present example is identical to that employed by the DNS (indeed, the lookup mechanism may be incorporated into the DNS though it can also be independently implemented).

Figure 1:
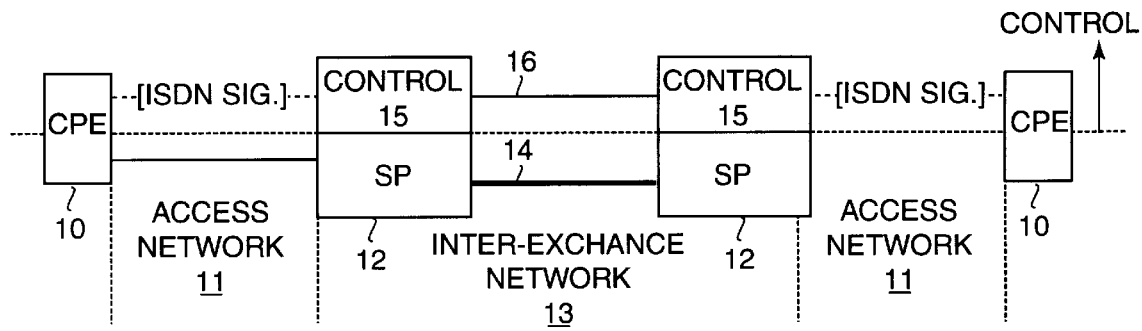
FIG. 1 is a simplified diagram of a standard PSTN.
Figure 2:
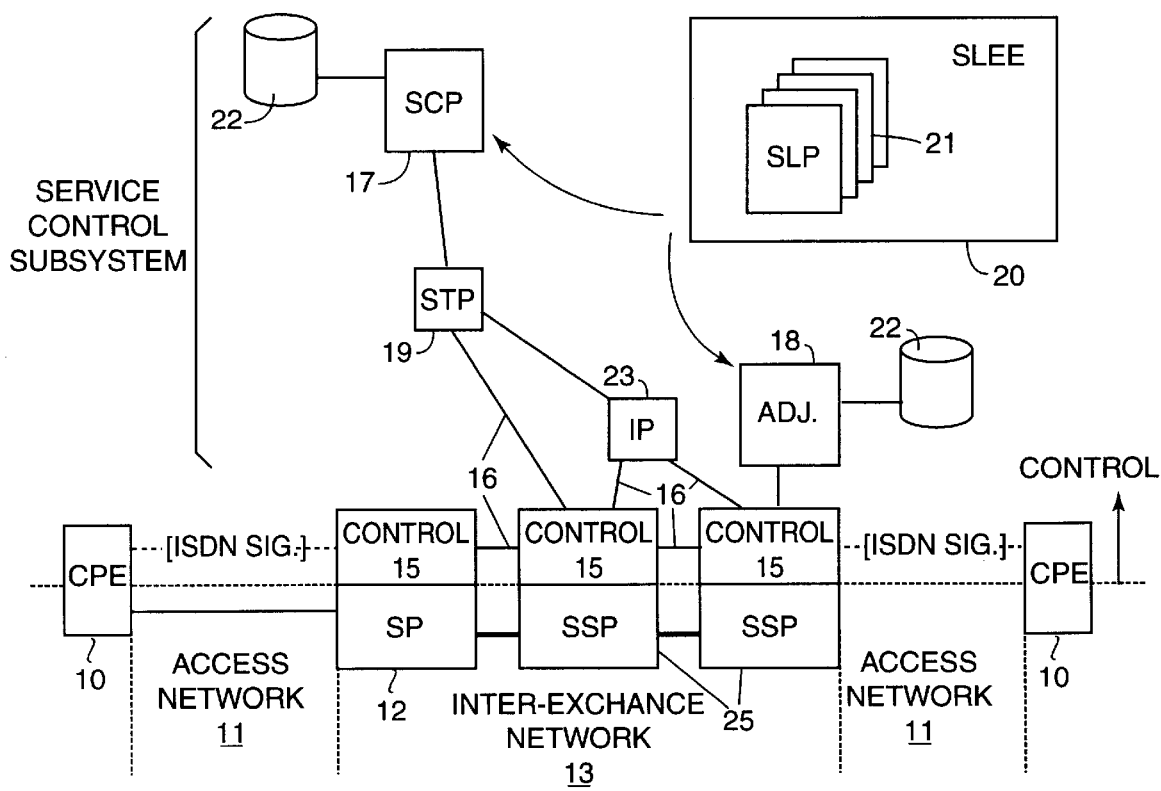
FIG. 2 is a simplified diagram of a known PSTN with IN service capability.
Figure 3:
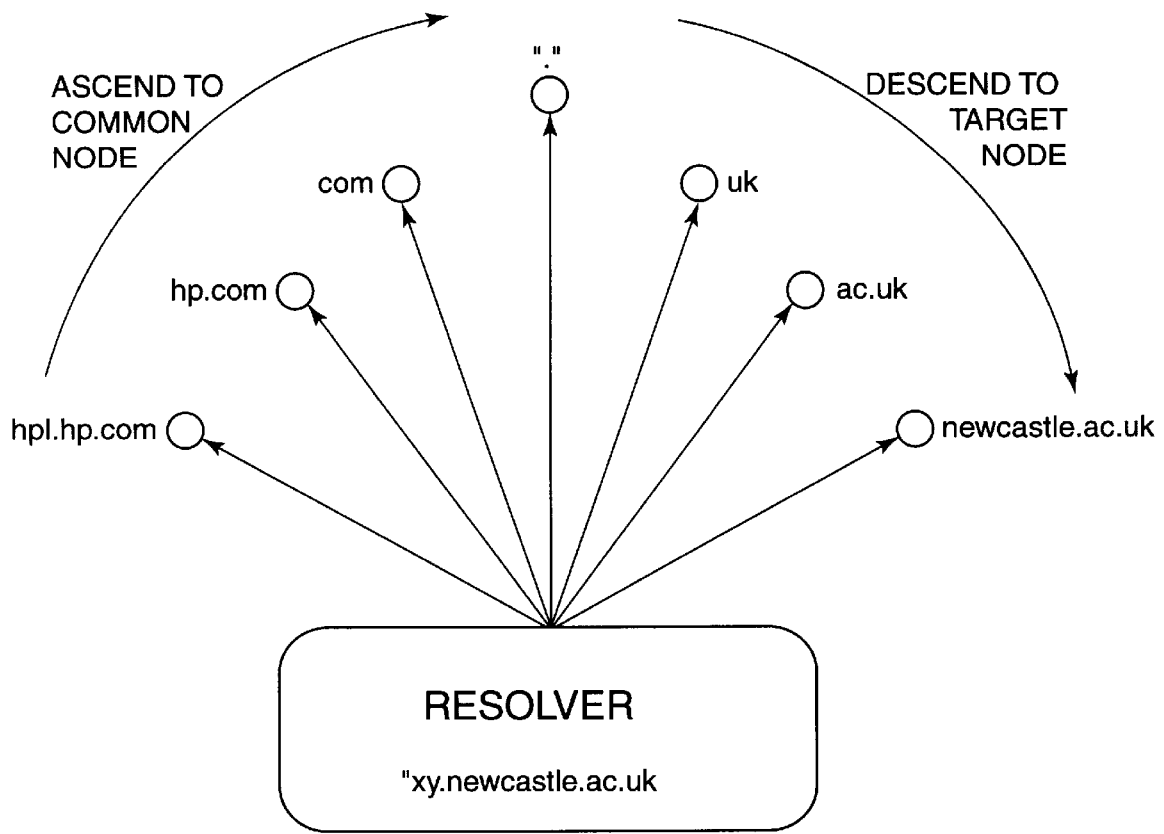
FIG. 3 is a diagram illustrating host domain name resolution by the DNS of the Internet.
Figures 4, 5:
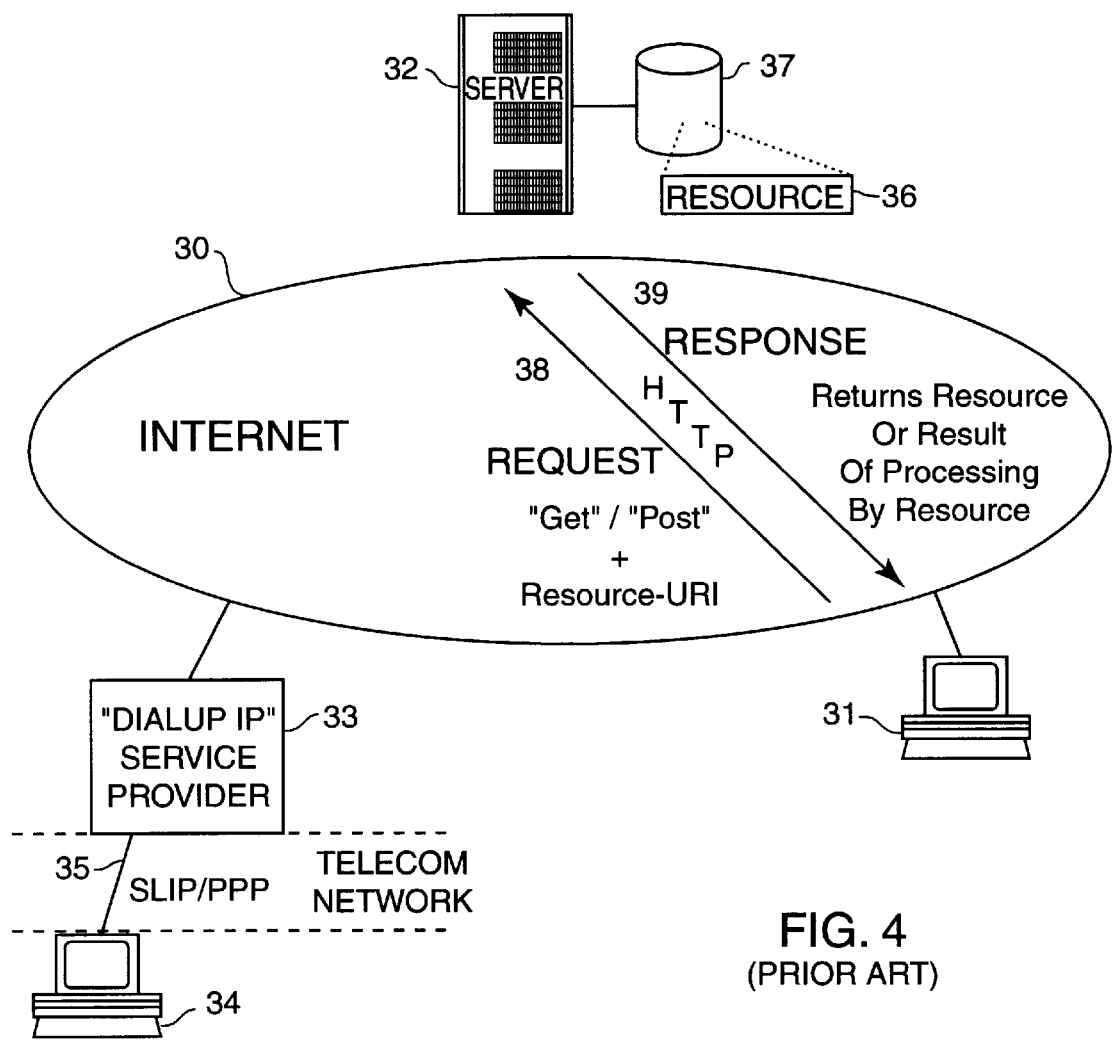
FIG. 4 is a diagram illustrating the functioning of the World Wide Web.
FIG. 5 is a diagram illustrating the format of a standard URL.

The nature of the DNS has already been described above with reference to FIG. 3 when the term "DNS-type" system was also introduced. For convenience in the following a DNS-type system organised to provide a telephone number to URI translation facility will be referred to as a "Duris" system (standing for "DNS-type URI Server" system).

The basic principles surrounding operation of a Duris system are:

every telephone number can be turned into a host domain name (the name space containing such host domain names for the telephone numbers of interest is referred to below as the "telname space"); and for every host domain name in the host domain space there is a Registration Record held by the Duris system containing the corresponding URI.

Thus, an input telephone number forming, in the present case, the UI part of a resource code 54 (see FIG. 11), is first parsed to form a domain name (step 120) and then passed to the Duris system (illustrated in FIG. 11 as formed by the DNS itself) to retrieve the RR with the corresponding URI (step 121). Following on from the URI lookup, if the URI returned has its host component as a domain name, the DNS is next used to derive the host IP address (step 122); this step is, of course not needed if the host component is stored as an IP address in the RR. The URI is then used to make a resource request to the appropriate server, passing any RRI part of the resource code 54 (step 123).

Figure 12A:
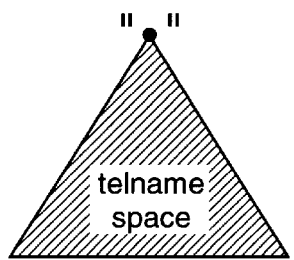
FIG. 12A is a diagram depicting a name space (the "telname space") constituted by the domain names derived by a parsing of a predetermined set of telephone numbers.

There are a number of possibilities at the top level as to how a Duris system could be implemented:

a) Independent of the DNS. In this option, the telname space constitutes the entire name space to be managed with the root of the telname space being the "." name space root (see FIG. 12A where the telname space is shown hatched). In this case, the Duris system is independent of the DNS itself. The Duris system could, of course, use the same basic infrastructure as the DNS (that is, the Internet) or an entirely separate network. Where the telname space comprises all the domain names corresponding to all public telephone numbers worldwide, parsing a full international telephone number would give a fully qualified domain name. Of course, the telname space could be a much smaller set of names such as those derived from internal extension numbers within a company having worldwide operations.

(b) Unfragmented Telname Space within the DNS. In this option, the telname space is a domain of the DNS name space and the Duris system is provided by the DNS itself. Thus, where the telname space comprises all domain names derived from public telephone numbers worldwide, the telname space could be placed within the domain of the ITU, in a special subdomain "tel", the root of the telname space then being "tel.itu.int." (see FIG. 12B where again, the hatched area represents the telname space). The responsability for administering the domain "tel.itu.int." would then lie with the ITU. With this latter example, to form a fully qualified domain name from an input telephone number, after the number has been parsed to form the part of the domain name corresponding to the structuring within the telname space, the tail "tel.itu.int." is added. The fully qualified domain name is then applied to the DNS and the corresponding RR record, holding the required URI, is retrieved. As a further example, the telname space could be all name derived from internal extension numbers within Hewlett-Packard in which case the root of the telname space would be "tel.hp.com." and Hewlett-Packard would be entirely responsible for managing this domain.

Figure 12B:
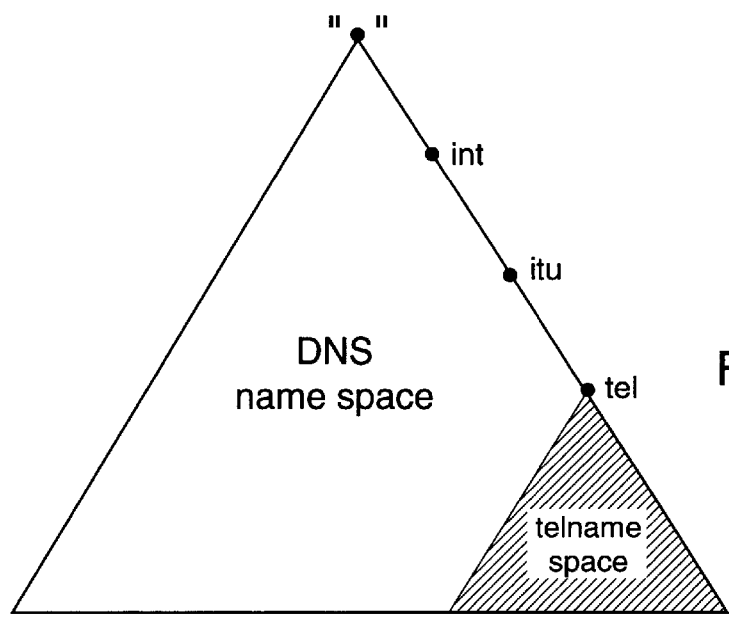
FIG. 12B is a diagram depicting the incorporation of the telname space without fragmentation into the DNS.
Figure 12C:
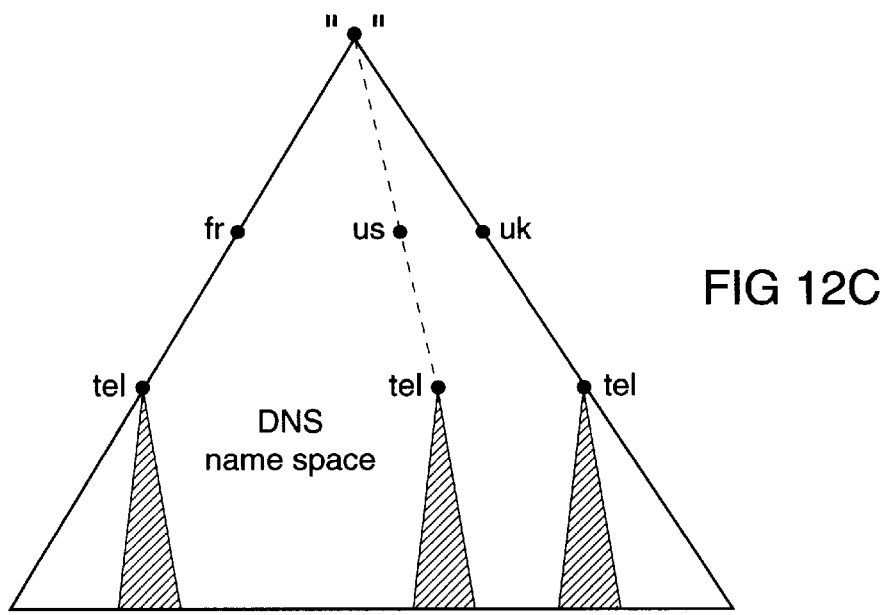
FIG. 12C is a diagram depicting the incorporation of the telname space in fragmented form into the DNS.

(c) Fragmented Telname Space within the DNS. In this option, the telname space is split between multiple domains of the DNS name space and the Duris system is provided by the DNS itself. Thus where the telname space comprises all domain names derived from public telephone numbers worldwide, the telname space could be split between respective "tel" subdomains of each country domain; thus, as illustrated in FIG. 12C, the part of the telname space corresponding to French telephone numbers would have a root of "tel.fr." and the part of the telname space corresponding to UK telephone numbers would have a root of "tel.uk.". The responsability for administering each "tel" subdomain would then lie with each country. With this latter example, to form a fully qualified domain name from an input telephone number, the part of the telephone number following the country code is parsed to form the part of the domain name within a country 'tel' subdomain and then a host domain name tail is added appropriate for the country concerned. Thus for a French telephone number, the "33" country code is stripped from the number prior to parsing and used to add a tail of "tel.fr. ". The tail appropriate to each country can be stored in a local lookup table. As a further example, two commercial organisations (X company and Y company) with respective DNS domains of "xco.com." and "yco.com." may agree to operate a common Duris system with a telname space split between "tel.xco.com." and "tel.yco.com." In this case, any Y company telephone number input from X company will be parsed to a fully qualified domain name terminating "tel.yco.com." and vice versa.

Consideration will next be given to the parsing of a telephone number into a domain name—in other words, where to insert the "." characters into the number to provide the structuring of a domain name. Of course, as already explained, telephone numbers are hierarchically structured according to each country's numbering plan. Thus one approach would be to follow this numbering plan structuring in dividing up a telephone number to form a domain name. By way of example, the telephone number "441447456987" which is a UK number (country code "44") with a four digit area code ("1447") and six digit local number ("456987") could be divided to form a domain name of 456987.1447.44 (note that the reversal of label order occassioned by the fact that the DNS labels are arranged least significant first). If the telname space is a subdomain of the DNS. with a placement as illustrated in FIG. 12B, the fully qualified domain name derived from the telephone number would be:

456987.1447.44.tel.itu.int.

There are however, difficulties inherent with trying to match the numbering plan hierarchy when parsing a telephone number into a host name. Firstly, in order to parse an international number correctly, it would be necessary for each entity tasked with this operation to know the structuring of each country's numbering plan and where, as in the UK, area codes may be of differing length the required knowledge may need to take the form of a lookup table. Whilst this is not a complicated computational task, it is a major administrative nuisance as it means that each country will need to inform all others about its numbering plan and any updates. The second problem is that a six or seven digit local number is a very large domain; it would be preferable to create subdomains for performance and scaling reasons but there is no obvious way of doing this.

These problems can be overcome by giving up the restriction that the parsing of telephone number into a domain name should match the structuring of national numbering plans. In fact, there is no strong reason to follow such a scheme as DNS servers know nothing about the meaning of the name space. It is therefore possible to parse telephone numbers using a deterministic algorithm taking, for example, 4 digits at a time to limit the size of each subdomain and making it possible to 'insert the dots' without knowing the numbering plan concerned. So long as the DNS domains and zones served by the DNS servers are created correctly it will all work.

For international numbers it would still seem appropriate to separate off the country codes and so a hybrid parsing scheme would be to parse the initial part of a dialled number according to known country codes and thereafter use a deterministic scheme (for example 3,7 or 4,6 or 3,3,4) to separate the digits. Of course, if a fragmented telname space is being used as illustrated in Figure UC then the country code is used to look up the host name tail and it is only the national part of the number which would be parsed.

Finally, as regards the details of how a DNS server can be set up to hold RR records with URIs, reference can be made, for example, to "DNS and BIND", Paul Albitz and Criket Liu, O'Reilly & Associates, 1992 which describes how to set up a DNS server using the Unix BIND implementation. The type of the RR records is, for example, text.

It should be noted that DNS labels should not in theory start with a digit. If this convention is retained, then it is of course a trivial exercise when parsing a telephone number to insert a standard character as the first character of each label. Thus, a 4 digit label of 2826 would become "t2826" where "t" is used as the standard starting character.

It will be appreciated that as with domain names, where an input telephone number is not the full number (for example, a local call does not require any international or area code prefix), it would be parsed into a domain name in the local domain.

The foregoing discussion of Duris system implementation, has been in terms of translating a telephone number into an URI where the telephone number forms the full UI of a resource code and the Duris system returns a full URI. It will be appreciated that the described Duris implementation can be readily adapted to accommodate the various modification discussed above regarding the form of the UI and what parts of the URI need to be looked up. For example, where there are a number of differents service resources associated with a subscriber each in its own file and the required source is identified by a pic part of the resource code, then the input telephone number will be used to look up, not the full URI, but the host component and that part of the path component up to the relevant subdirectory, the pic part of the UI then being appended to identify the required resource file.

For small local Duris implementations, it may be possible to have a single server; the implementation should still, however, be considered as of a DNS type provided the other relevant features are present.

Nature of Service Resources

Turning now to a consideration of the service resources 49, how these service resources can be provisioned onto the servers 51 will be described more fully below but, by way of present example, the service resource or resources associated with a particular PSTN user (individual or organisation, whether a calling or called party) can be placed on a server 51 over the Internet from a user terminal 53 in one or more WWW pages.

Consider the simple case where the service resource is a service data item such as a telephone number (for example, an alternative number to be tried if the user's telephone corresponding to the number dialled by a calling party is busy). This diversion number could be made the sole service resource of a phone page of the user. The phone page URI could be a URL with scheme set to HTTP in which case the GET method could be used to retrieve the diversion number. Such an arrangement is suitable if the phone page is only to be used for functional retrieval of the diversion number. However, if the diversion number is to be visually presented at a user terminal 53, then it may be desirable to accompany the number with explanatory material (this will often not be necessary as the diversion number can be arranged to be returned into an existing displayed page that already provides context information). However, where the phone page does include explanatory material as well as the diversion number, an entity only wishing to make functional use of the phone page, could be arranged to retrieve the phone page and then extract the diversion number (this would, of course, require a standard way of identifying the information to be extracted from the phone page).

An alternative and preferred arrangement for providing for both viewing and functional access to a resource requiring explanatory material for viewing, is to use an object-oriented approach to resource design. In this case, the resource object would have two different access methods associated with it, one for purely functional use of the resource and the other enabling viewing of associated explanatory material. It would then be up to the accessing entity to access the resource object using the appropriate object method.

Yet another arrangement for providing for both viewing and functional use of the diversion number, would be to provide separate resources appropriately configured for each use, each resource having its own resource code (generally, both such resources would be placed on the same phone page and in this case the UI part of each resource code would be the same).

Retrieval of a phone page for use by a human user will generally not be as time critical as retrieval for operational use by a PSTN. Thus, while for human use the scheme specified in the URL of a service resource could be HTTP, it may be advantageous for operational use to define a special "phone" scheme (access protocol) which would result in the server 51 using an optimised access routine to access the required resource (diversion number, in the current example) and respond to the accessing entity in the minimum possible time.

Besides data items, other possible types of service resource include service logic for execution in place (at the server) with the result of this execution being returned to the entity accessing the resource; service logic downloadable from the server to the accessing entity for execution at that entity; and a logging resource for logging information passed to it by the accessing entity (or simply for logging the fact that is has been accessed). It will be appreciated that the logging resource is really just a particular case of service logic executable in place.

By way of example, a service resource constituted by execute-in-place service logic can be arranged to implement time-of-day routing, the result of executing the service logic being the telephone number to which a call should be routed taking account of the time of day at the called party's location. An example of a service resource constituted by downloadable service logic is service logic for controlling calling-party option interrogation using the facilities provided by an IP. As regards the logging resource, this can be used for recording the number of calls placed to a particular number.

Where each resource has its own phone page and the resource is present only in its unembellished functional form, then the HTTP scheme can be employed for access using the GET method for both the downloadable service logic and the execution-in-place service logic, and the POST method for the logging resource. If it is desired to provide an explanatory material with each service resource, then any of the solutions discussed above in relation to data items, can be used.

Where more than one service resource is to be associated with a number, then each such resource can be placed on a respective phone page with its own URI. However, the preferred approach is to place all such service resources on the same page and use the RRI part of the corresponding resource codes to enable access to the appropriate resource. The accessed resource is then treated according to its form (executed if execute-in-place service logic, returned if downloadable service data or logic).

Thus if both a diversion-number service-data resource and a time-of-day execution-in-place service-logic resource are placed on the same phone page, the diversion-number resource code might have an RRI of "1" whilst the time-of day resource code might have an RRI value of "2".

Where calling/called party options are to be included in a service resource for presentation to such party, then as already indicated, this can conveniently be done by constituting the service resource as downloadable service logic with the chosen option possibly initiating request for a follow-up service resource.

It will be appreciated that a service resource will often be of a complex type, combining service data and/or downloadable service logic and/or execute in place service logic. A particularly powerful combination is the combination of the two types of service logic where the downloadable service logic is designed to interact with execute-in-place service logic; using this arrangement, the user can be presented with complex client-server type applications.

Example Usage of Service Resource

Figure 13:
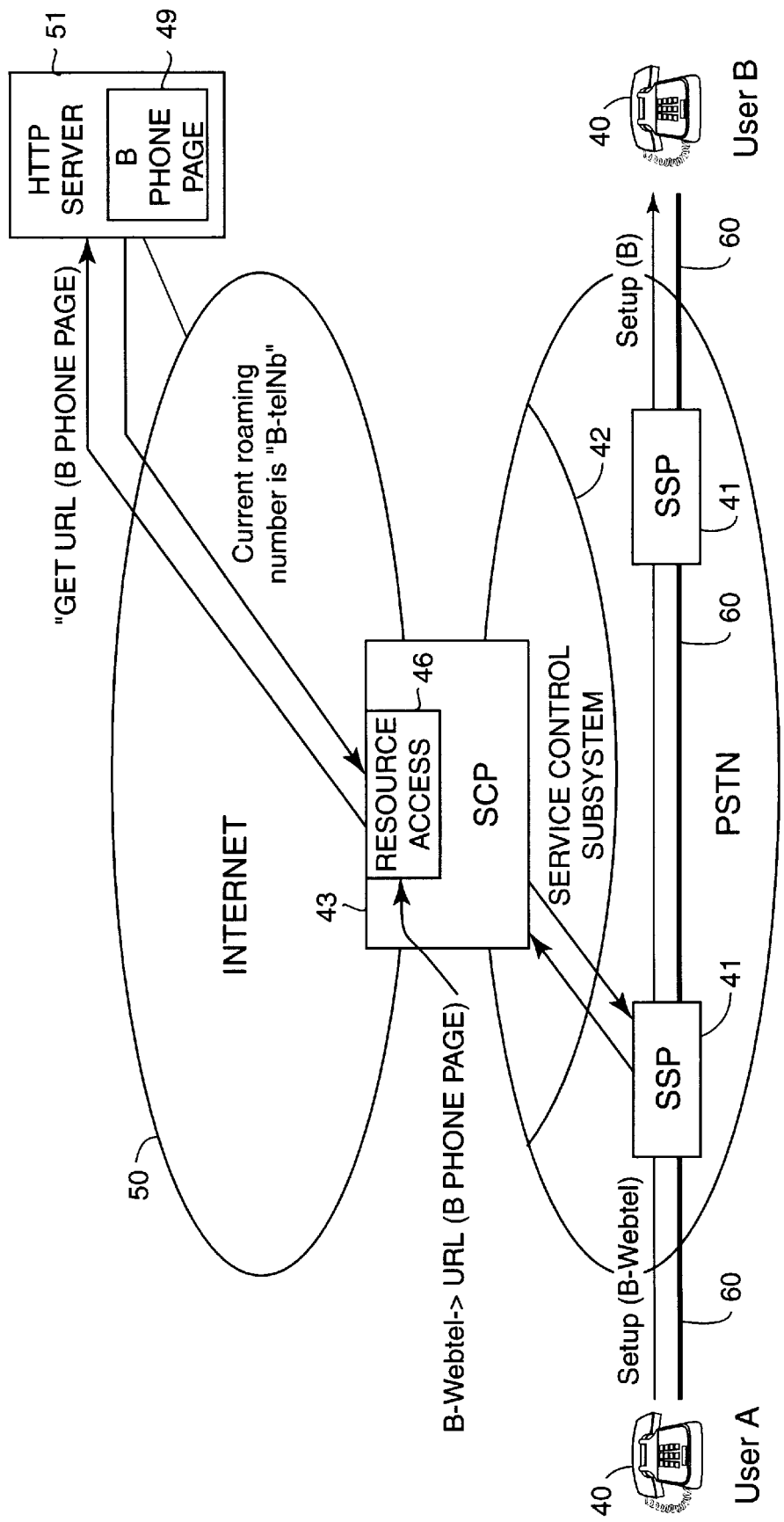
FIG. 13 is a diagram illustrating the overall operation of the FIG. 6 arrangement in providing a roaming number service in response to a telephone number being dialled at a standard phone.

FIG. 13 illustrates the operation of a service making use of a resource on a server 51. This service is equivalent to a "personal number" service by which a user can be accessed through a single, unchanging number even when moving between telephones having different real numbers. To achieve this, the user requiring this service (user B in the current example) is allotted a unique personal number (here referred to as the "Webtel" number of B) from a set of numbers all of which have the same leading number string to enable an SSP to readily identify a dialled number as a Webtel number. User B has a service resource 49 on a dedicated phone page on HTTP server 51, this phone page being located at a URL here identified as "URL (B phone page)". B's phone page when accessed returns the current roaming number (" B-telNb") where B can be reached. In the simplest case, B's phone page is just a single number that can be modified by B (for example, from a terminal 53) as B moves to a different phone. More likely is that B's phone page is an execute-in-place service logic providing time of day routing.

In the present example, the association between B's Webtel number and the URL of B's phone page is stored in an association table accessible to SCP 43.

Upon a user A seeking to contact user B by dialling the Webtel number of B, the telephone 40 being used by A passes a call set up request to SSP 41 (note that in FIG. 13 the bearer paths through the telephony network are shown by the thicker lines 60, the other heavy lines indicating signalling flows). SSP 41 detects the dialled number as a Webtel number and sends a service request to SCP 43 together with B's Webtel number. SCP 43 on receiving this service request initiates a service logic program for controlling translation of B's Webtel number into a current roaming number for B; in fact, in the present case, this program simply requests the resource access block 46 to access the service resource identified by B's Webtel number, (that is, B's phone page 49) and return the result of this access. To this end, block 46 first translates B's Webtel number into the URL of B's phone page and then uses this URL to access B's phone page over the Internet (for example, using the 'phone' scheme already referred to with a method corresponding to the HTTP GET method). This results in B's current roaming number B-telNb being passed back to block 46 and in due course this number is returned to the SSP 41 which then initiates completion of call set up to the telephone 40 corresponding to B-telNb.

The FIG. 13 example related to a called-party service; it will, of course, be appreciated that the principle of accessing service resources over the Internet can be applied to all types of services, including both calling-party and called-party services and hybrids. Thus, standard 800 number services can be implemented with the dialled 800 number resulting in access to a phone page resource constituted by execute-in-place service logic that returns the most appropriate number for controlling onward call routing.

It will be appreciated that although in the FIG. 13 example the service request from the SSP was triggered by a leading number string of a dialled number, a service request may be triggered by a variety of triggers including calling-party number, called-party number, or some other user input, such triggers being possibly qualified by call setup progress (for example, called-party number qualified by a busy status or by ringing for more than a certain time).

With respect to the logging service resource mentioned above, one possible application for such a resource is in telephone voting. In this case, dialling the voting number causes the SSP picking up the call to pass a service request to SCP 43 which then contacts the appropriate logging resource over the Internet to register a vote after which the call is terminated. To minimise bottlenecks, a logging resource could be provided at a different URL for each SCP, it being a simple matter to collect and collate voting from all these logging resources over the Internet. If an SCP with Internet access is provided at every SSP, then the risk of congestion is greatly reduced.

As already noted, a user's phone page may hold multiple service resources in which case the access request from the accessing SCP needs to contain an appropriate RRI identifying the required resource.

In the event that an SCP is to provide both a traditional IN service to some users and an equivalent service using an Internet-accessed service resource to other users, then a lookup table may need to be provided in the SCP to ensure that a service request is appropriately handled; such a lookup table can conveniently be combined with the customer record database.

Once a user, such as user B, has set up one or more phone pages specifying his desired service resources (particularly service logic defining personalised services), it is clearly logical for user B to want any PSTN operator he cares to use, to access and utilise such service resources. This is possible if the Webtel-to-URI databases are available to all operators. Thus multiple operators could be set to access B's phone page or pages. If an operator declines to use B's phone pages, B can obviously chose not to use that operator (at least where that operator provides a long haul carrier service subject to user selection). The possibility therefore arises that service provision will cease to command a premium from operators, but that the provision of phone-page utilisation by an operator will become a necessary basic feature of PSTN operation.

Provisioning and Updating Service Resources

Consideration will next be given as to how the service resources 49 are provisioned to the servers 51 and subsequently updated.

So far as provisioning is concerned, two basic actions are required: firstly, the service resource must be placed on a server 51 and, secondly, the URI of the service resource must be notified to the PSTN operator along with the trigger conditions (number plus any other condition such as point in call) calling for access to the resource; if multiple resources are provided at the same URI, then the RRI values needed to retrieve the appropriate resource for a particular trigger condition, must also be notified. This notification process will be referred to hereinafter as 'registering' the service resource with the PSTN operator; registration is, of course, necessary to enable the association tables used by SCP 43 to be set up and for trigger conditions to be set in SSPs 43. For certain services, such as that described above with reference to FIG. 13, it is not the user that supplies the triggering number (the Webtel number in the FIG. 13 example); instead, the PSTN operator allocates an appropriate number to the user as part of the registration process.

As to the process of placing a service resource on a server 51, how this is carried out will depend on the attitude of the PSTN operator to the possible effects of such service resources on operation of the PSTN. Where the service resource simply returns a data item to an accessing entity, then an operator may not be too concerned about possible errors (accidental or deliberate) in implementing the service resource. However, the operator will probably be much more concerned about the proper operation of any service logic that may be returned by a resource; indeed, an operator may not permit such a service resource.

Assuming for the moment that an operator has no concerns about the nature or implementation of service resources, then how a resource is placed on a server 51 will largely depend on the nature of the server concerned. For example, if a user has a computer with network access to the Internet and this computer is used as server 51, then the user can simply load a desired resource onto the server as a WWW phone page for external access. A similar situation arises if the server is an organisation server to which the server has access over an internal LAN. In both these latter cases, loading the resource as a WWW phone page does not itself require Internet access. However, if the server 51 is one run by an external Internet service provider, then a user can arrange to download the required service resource into the user's allocated Web site space on the server; this may or may not involve Internet access. One special case of this latter scenario is where the PSTN operator provides a special server for user phone pages containing service resources.

Except where a user's own computer acts as server 51, placing a service resource on a server will generally involve clearing one or more levels of password protection.

As regards the origin of the service resource loaded by a user onto server 51, this may be generated by the user or, particularly where the resource includes service logic, may be provided by a third party (including the PSTN operator).

If the PSTN operator wishes to have control over the service resources 49 to avoid any adverse effects on operation of the PSTN, two approaches are possible. Firstly, the operator could require that every resource (or, possibly, a particular subset) had to be subject to a verification process before use, appropriate measures then being taken to avoid subsequent alteration of the resource by the user (except, possibly, for particular data items); in this respect, the operator could require that the resource be placed on a server under the operator's control and to which the user had no write access (except possibly for altering particular data items, as indicated above). A second, more attractive, approach to minimising adverse effects by the service resources 49, is for the operator to provide standard service resources to which a user could add the user's own data (and possibly make limited functional selections in case where the resource included service logic); the customised resource would then be loaded onto a server 51 controlled by the operator. This process can be conveniently implemented for a particular resource using an HTML "form" which a user could download over the WWW from the operator-controlled server. After completing the form and activating a 'commit' graphical button of the form, the entered information would be 'posted' back to the server where the information would be used to produce a customised service resource thereafter placed on the server for access over the Internet. An advantage of this approach is that registration of the service resource with the operator is simultaneaously effected. (It may be noted that if registration needs to be done as a separate act from having a service resource loaded on a server, then using an HTML form is a very convenient way to implement the registration process).

From the foregoing it can be seen that whilst the provisioning process does not necessarily require information to be passed over the Internet, in many cases this will be the best solution, particularly if an HTML form exchanged over the WWW can be used to produce a customised service resource. It should be noted that producing a customised service resource using an HTML form is not limited to cases where the PSTN operator controls the server.

As regards updating service resources, there is likely to be a need to update certain data items on a fairly frequent basis (for example, roaming number). Where the PSTN operator does not place any controls on the service resources 49, then update is a relatively simple matter, only requiring write access to the server concerned (as already indicated, this will generally involve one or more levels of password protection). However, where the PSTN operator exercises control over the service resources, for example by only permitting customisations of standard service resources, such customised resources being loaded on servers controlled by the operator), then write access to the service resource may be tightly controlled. Again, an HTML form may conveniently be used as the medium for modifying a data item in such cases; to the operator, this has the benefit of limiting the modifications possible whilst to the user, a form interface should provide a simple route to resource modification.

For more complex updates, it may be necessary to go through a process similar to that required for initial provisioning.

Particularly where the service resources are held on a server 51 controlled by the PSTN operator, resource update will generally involve communication over the Internet.

Web User Interaction

Consideration will next be given to other possible uses of the service resources held in phone pages on the servers 51. For example, if user B's phone page contains a diversion number, then provided this phone page is read-accessible over the Internet from user A's terminal 53, user A can use a graphical Web browser running on terminal 53 to view B's phone page and discover B's diversion number. As earlier discussed, the diversion number may be passed to user A for display in an existing visual context giving meaning to the number, or may be passed to user A with accompanying explanatory text.

A more useful example is a current roaming number service for user B. Suppose B's phone page 49 on server 51 (see FIG. 14) is operative when accessed to return a current roaming number where B can be reached. Further suppose that user B has a Web site with several Web pages written in HTML and each page contains a graphical 'phone' button which when activated uses the GET method to access B's phone page by its URL. Now if user A whilst browsing (arrow 66) B's Web site over the WWW from user A's terminal 53, decides that he would like to call user B to discuss some item of interest, user A simply activates the phone button 65 on the currently viewed page of B. This causes B's phone page to be accessed using the H=r request "GET URL (B Phone Page)"—see arrow 67.

B's current number to be called is then determined and passed to user A's terminal 53 (see arrow 68) where it is displayed. An explanatory text concerning the number will generally also be displayed; for example the text "Please call me at the following number:" could be displayed, this text being provided either by the HTML script associated with the phone button, or from the phone page when returning the current number. In fact, it would probably be more helpful to provide user A, not only with the current number for reaching user B, but also with all numbers where B could be reached together with the times when B was most likely to be at each number. Since this extra information is likely to be subject to frequent change, the only sensible way to provide the information is from the phone page. Thus, B's phone page not only provides the current number for reaching B, but also a text that includes numbers and times subject to change; scripting B's phone page is, of course, done in a way that ensures that variable data need only be altered in one place.

In a further example, B's phone page might include downloadable service logic for execution at user A's terminal. This is useful where choices are to be presented to a user, each choice producing a follow-up action such as fetching a further phone page. For example, the first-accessed phone page may be a family phone page giving the general telephone number for a family but also giving the user the possibility of selecting further phone information on each family member, such as a time-of-day dependent number; in this case, each family member has their own follow-up phone page.

In the above scenarios, user A has been presented with a number to call over the PSTN. User A can now pick up his standard telephone and dial the number given. In fact, a complication arises if A only has Internet access via a SUP/PPP connection over an ordinary, non-ISDN, PSTN line since, in this case, A's telephone line is already tied up with making Internet access when gateway 90 seeks to set up a call to A's telephone; with an ISDN connection, as two channels are available, this problem does not arise. One way of overcoming this problem would be to have user A's terminal 53, after obtaining the number to call from B's phone page, automatically suspend its Internet session by storing any required state information (for example, current WWW URL being accessed) and then terminate its SLIP/PPP connection to thereby free up the telephone line. A can then telephone B. At the end of this call, A can resume the suspended Internet session, using the stored state information to return to the point where A left off to call B. An alternative approach is to operate a suitable multiplexing modulation scheme on the telephone line to A allowing voice and data to be simultaneously carried. A number of such schemes already exist. The PSTN would then need to separate the combined data and voice streams coming from A at some point and pass each to its appropriate destination (the Internet data being forwarded to the ISP providing the SLIP/PPP connection for user A and the voice stream being passed to B); of course, data and voice traffic in the reverse direction would also need combining at some point for sending over the last leg to A's terminal.

Rather than A manually dialling B using a standard telephone, another possibility is that user A's terminal is provided with functionality enabling A to make a call over the PSTN from his terminal; this functionality generally comprises a hardware interface 70 (FIG. 14) to a telephone line and phone driver software 71 for driving the interface 70 in response to input from application software such as the Web browser 73. A could call up his phone software and enter the required number or, preferably, A need only "select" on screen the number returned from B's phone page and then pass it into A's phone software. Indeed, provided user B knew the software interface to the software 71 providing dialling functionality on A's terminal, it would be possible for B's phone page to return to A's terminal program code for automatically dialling B's number upon A confirming that he wishes to proceed with call placement. As an alternative to placing a voice call, if A's terminal is equiped with a suitable modem and controlling software. A could, instead, elect to send a fax or data to B through the PSTN either to B's ordinary number or to one specified in B's phone page as the number to be used for such transmissions. Of course, placing a call from A's terminal over the PSTN may be subject to the problem already discussed of conflict for use of the telephone line where this is not an ISDN line and A gains Internet access via a SLIP/PPP connection.

However the call is placed, if B's telephone corresponding to the number tried by A is busy, a number of possibilities exist. Thus if B has a phone page that specifies a diversion number, and B has registered this service resource with the PSTN, then the diversion number should be automatically tried by the PSTN. However, if the diversion number resource has not been registered with the PSTN, a busy signal will returned to A. Where A has placed the call through a standard telephone, A must now decide how to proceed and A may elect either to give up or to refer again to B's phone page to look up the diversion number and redial using this number. If A placed the original call using his terminal 53 then the latter can be programmed to detect the return of a busy signal and then automatically look up B's diversion number and redial using this number. This functionality can be included in service logic downloaded from B's phone page and run on A's terminal.

If A had to terminate his Internet session in order to free up the telephone line for voice use, then referring back to B's phone page requires a new Internet session to be started (in fact, this inconvenience could be avoided if B's diversion number were passed to A's terminal at the time the original number to be dialled for B was supplied).

The service resource accessed on B's phone page upon B's telephone being busy may, of course, be more complex than just a diversion number. In particular, user A may be presented with a range of options including, for example, B's fax or voice mailbox number, the selection of an option potentially initiating the running of appropriate accessing software. Another possible option would be for A to leave B a call back message using a form downloaded from B's phone page upon this option being chosen; the completed form would be posted back to server 51 and logged for B to check in due course.

Of course, it may arise that user A wishes to access B's phone page to find out, for example, B's current roaming number, but user A does not know the URI of B's Web site and only has B's Webtel number. A could just call B through the PSTN in which case the translation of B's Webtel number to roaming number would be automatically effected (assuming B is still registered for this service); however, A may not wish to call B straight away, but just note his current roaming number. In order to solve A's problem, the Webtel-to-URI association tables previously described are preferably made accessible on the Internet at a known address (for example, at a known Web site). All that A need now do is to access this Web site passing B's Webtel number; B's phone page URI will then be returned to A who can then use it to access B's phone page. This process can, of course be made automatic from the point when A sends B's Webtel number to the association-table Web site.

Internet/PSTN Call Interface

Figure 14:
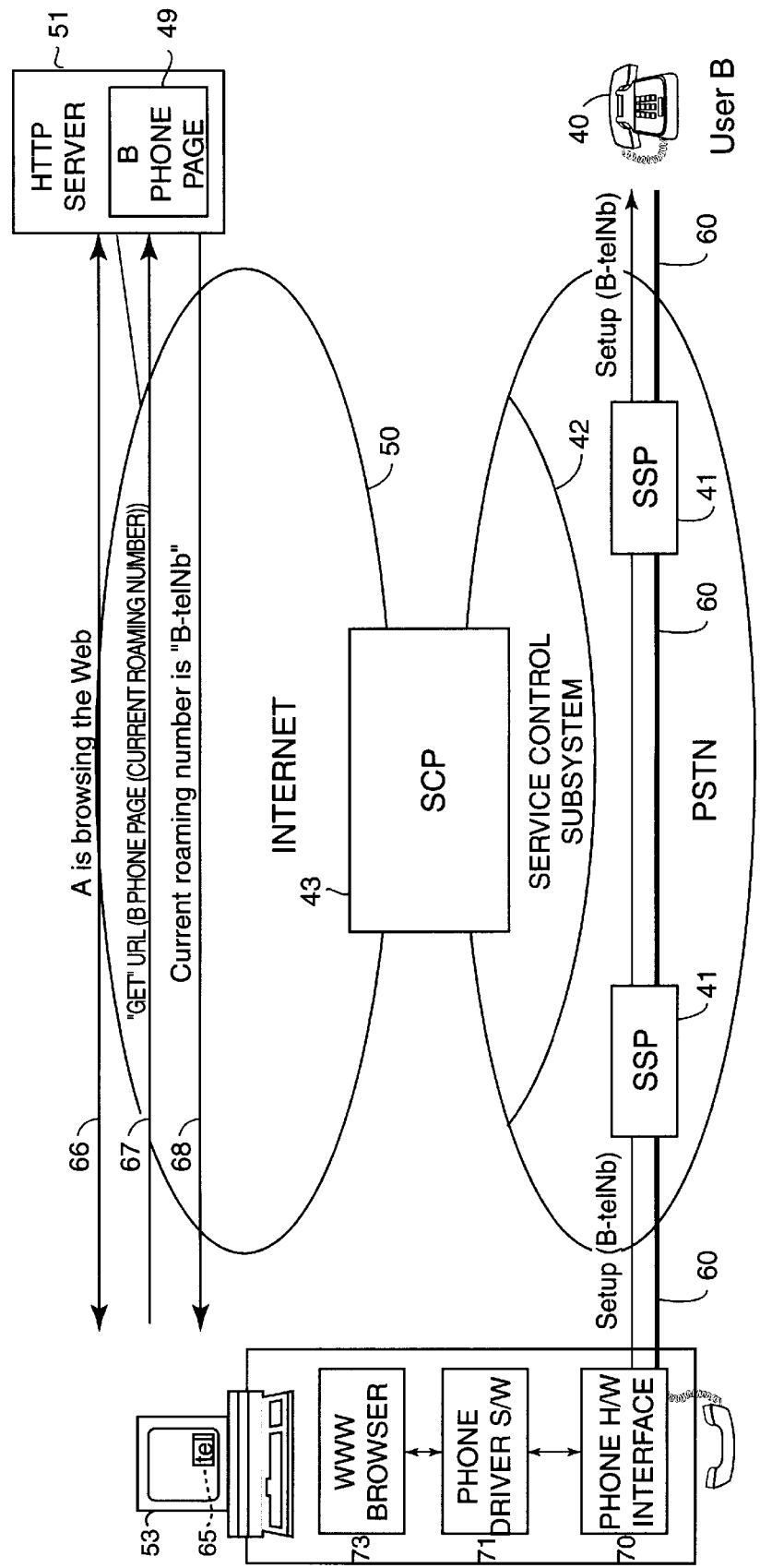
FIG. 14 is a diagram illustrating the overall operation of the FIG. 6 arrangement when utilised by a Web user in setting up a call through a telephone interface integrated into the user's Web terminal.
Figure 15:
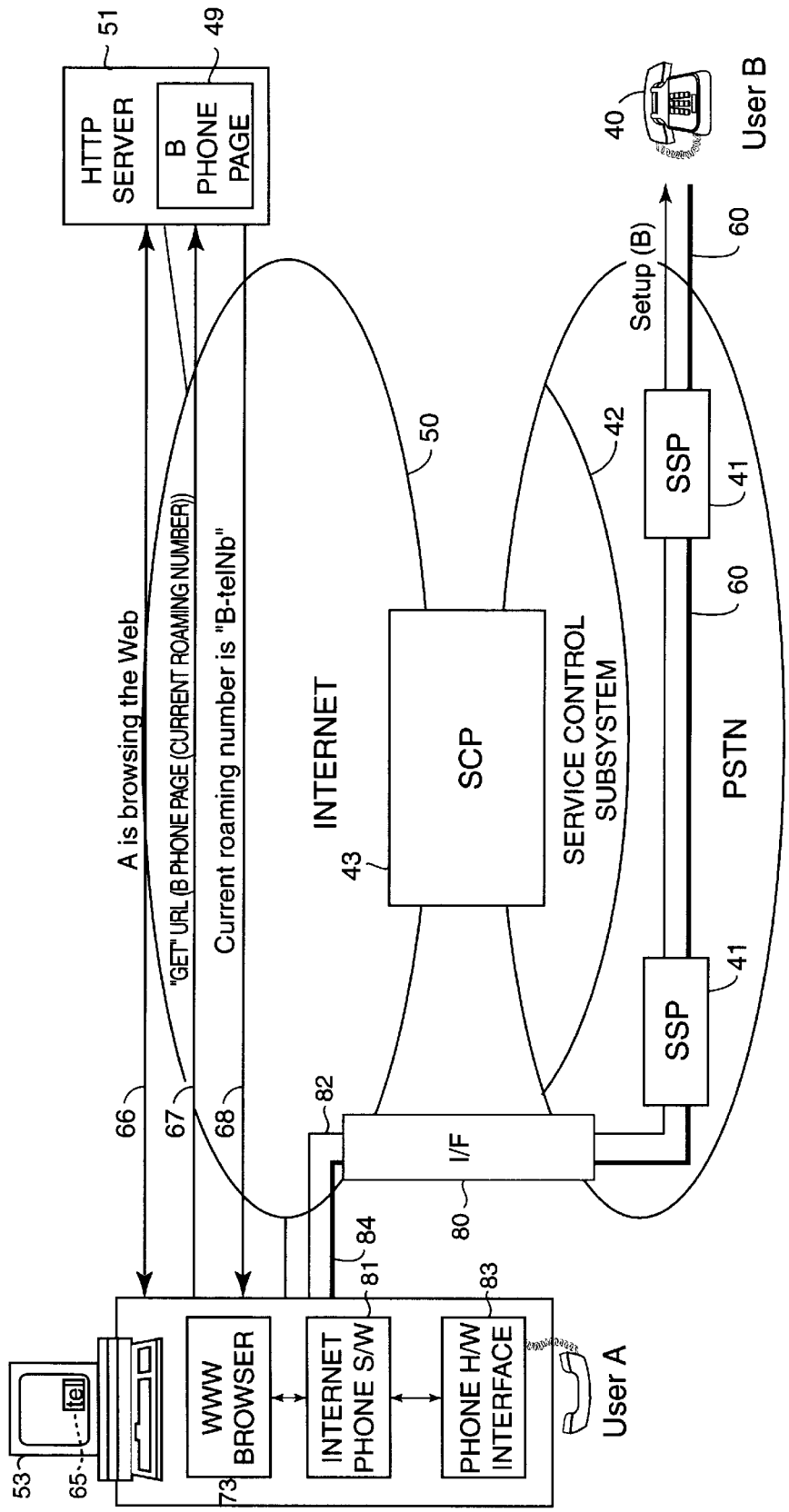
FIG. 15 is a diagram illustrating the overall operation of an arrangement in which an interface is provided between the PSTN and the Internet for telephone traffic.

In the FIG. 14 scenario, A's access to the PSTN was through a standard telephone interface even though the actual form of A's telephone differed from standard by being integrated into A's computer terminal 53. FIG. 15 illustrates a situation where A, after being supplied with B's current roaming number as in the FIG. 14 case, calls B via a route that starts out over the Internet and then passes through a user network interface 80 into the PSTN. Interface 80 is arranged to convert between ISDN-type telephone signalling on the PSTN and corresponding signalling indications carried across the Internet in IP packets; in addition, interface 80 transfers voice data from IP packets onto trunk 60 and vice versa.

Thus, upon A initiating a call to B, Internet phone software 81 in A's terminal sends call initiation signalling over the Internet to interface 80, the address of which is already known to A's terminal. At interface 80, the signalling is converted into ISDN-type signalling and passed to SSP 41. Call set up then proceeds in the normal way and return signalling is transferred back through interface 80, over the Internet, to the software 81 in A's terminal. This software passes call setup progress information to the WWW browser 73 for display to A. Upon the call becoming established, A can talk to B through his telephone and A's voice input is first digitised in phone hardware interface 83 and then inserted into IP packets by software 81 to traverse the Internet to interface 80 (see arrow 84); voice traffic from B follows the reverse path.

IN services can be provided to this call by SCP in response to a service request from an SSP 41. Thus, if B's phone is busy, and B is registered for call diversion, SCP 43 on receiving a service request will access B's appropriate phone page for call diversion and retrieve the diversion number. If SSP 41 is not set to initiate a service request on B's telephone being busy, the busy indication is returned to A's terminal where it can be handled in the manner already described with reference to FIG. 14.

In fact, interface 80 can be provided with functionality similar to an SSP to set trigger conditions and generate a service request to SCP 43 on these conditions being satisfied.

Third-Party Call Setup Gateway

Figure 16:
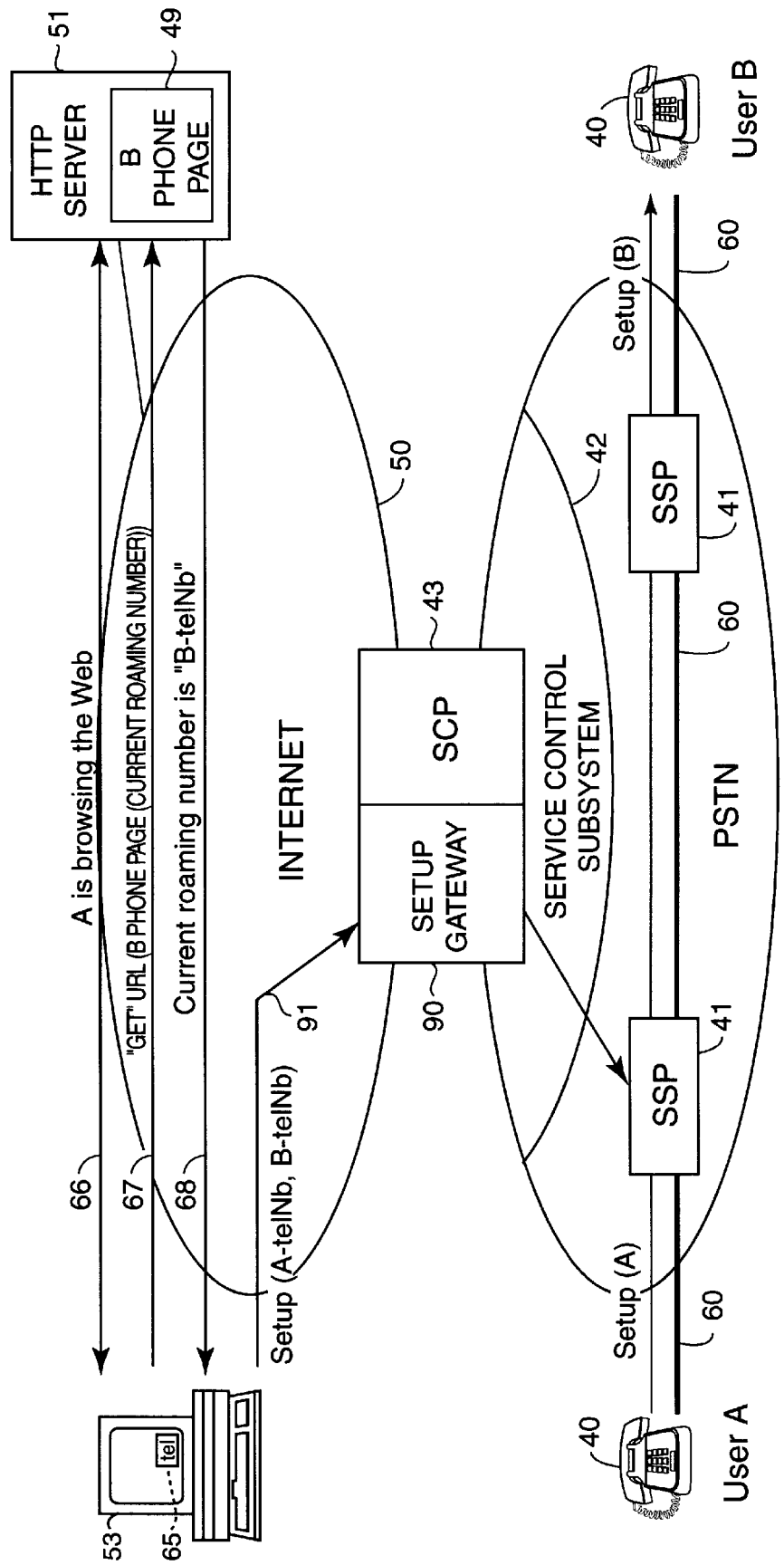
FIG. 16 is a diagram illustrating the overall operation of an arrangement in which a call setup gateway is provided between the Internet and the PSTN.

FIG. 16 illustrates a further arrangement by which A can call B after receiving B's current roaming number. In this case, a third-party call set-up gateway 90 is provided that interfaces both with the Internet 50 and with an SSP 41. Conveniently, gateway 90 can be co-located with SCP 43 (though this is not essential). Gateway 90 has the capability of commanding SSP 41 to set up a call between specified telephones.

Thus, upon A wishing to call B, a third-party call setup request is sent from A's terminal over the Internet to the gateway 90 (see arrow 91). This setup request includes A's telephone number and B's current roaming number. Gateway 90 first attempts to setup the call to A's telephone (which should generally succeed) and thereafter to set up the call to B's identified telephone. Once the call is setup, A and B communicate in standard manner across the PSTN.

If B's phone had been busy, then any of the previously described scenarios may ensue.

Gateway 90 can also be arranged to make service requests to SCP 43 upon predetermined trigger conditions being satisfied. Thus, gateway 90 might be set to pick up the busy condition on B's telephone and initiate a service request to SCP 43 for a diversion number. However passing the busy indication back to A's terminal via gateway 90 is preferred because of the flexibility it gives A regarding further action.

As already generally discussed in relation to FIG. 14, a complication arises if A only has Internet access via a SLIP/PPP connection over an ordinary, non-ISDN, PSTN line since, in this case, A's telephone line is already tied up with making Internet access when gateway 90 seeks to set up a call to A's telephone. The solutions discussed in respect of FIG. 14 (termination of Internet session; multiplexing voice and Internet data on same telephone line) can also be used here. An alternative approach both for FIG. 14 and for FIG. 16 scenarios is possible if user A's terminal can handle a voice call as digitised voice passed over the Internet. In this case, the voice call can be placed through an interface 80 of the FIG. 15 form, and the voice traffic and the Internet communication with the B's phone page and/or gateway 90 are both carried in Internet packets passed over the SLIP/PPP connection to/from A's terminal 53 but as logically distinct flows passed to separate applications running on terminal 53.

It may be noted that the third party call setup request made by A's terminal to gateway 90 could equally have been made by service logic held in B's phone page and executed by server 51 (such an arrangement would, of course, require A's telephone number to be passed to B's phone-page service logic and this could be arranged to occur either automatically or through a form presented to user A at terminal A and then posted back to server 51).

It may also be noted that the interface 80 of FIG. 15 and the gateway 90 of FIG. 16 provide examples of service requests being passed to the service control subsystem by entities other than SSPs 41.

WWW-based "FreePhone" (800 number) Services

It is possible to implement a "FreePhone" or "800 number" type of service using a combination of the WWW and the PSTN. As will be seen from the following description of such a service with reference to FIG. 17, a WWW/PSTN implementation does not necessarily rely either on transferring call charges from the calling to called party or on the use of a special "800" number, two characteristics of standard "Freephone" schemes. The WWW/PSTN implementations do, however, possess the more general characteristic of placing an enquiring party and the party to whom the enquiry is directed, in telephone contact at the expense of the latter party.

Figure 17:
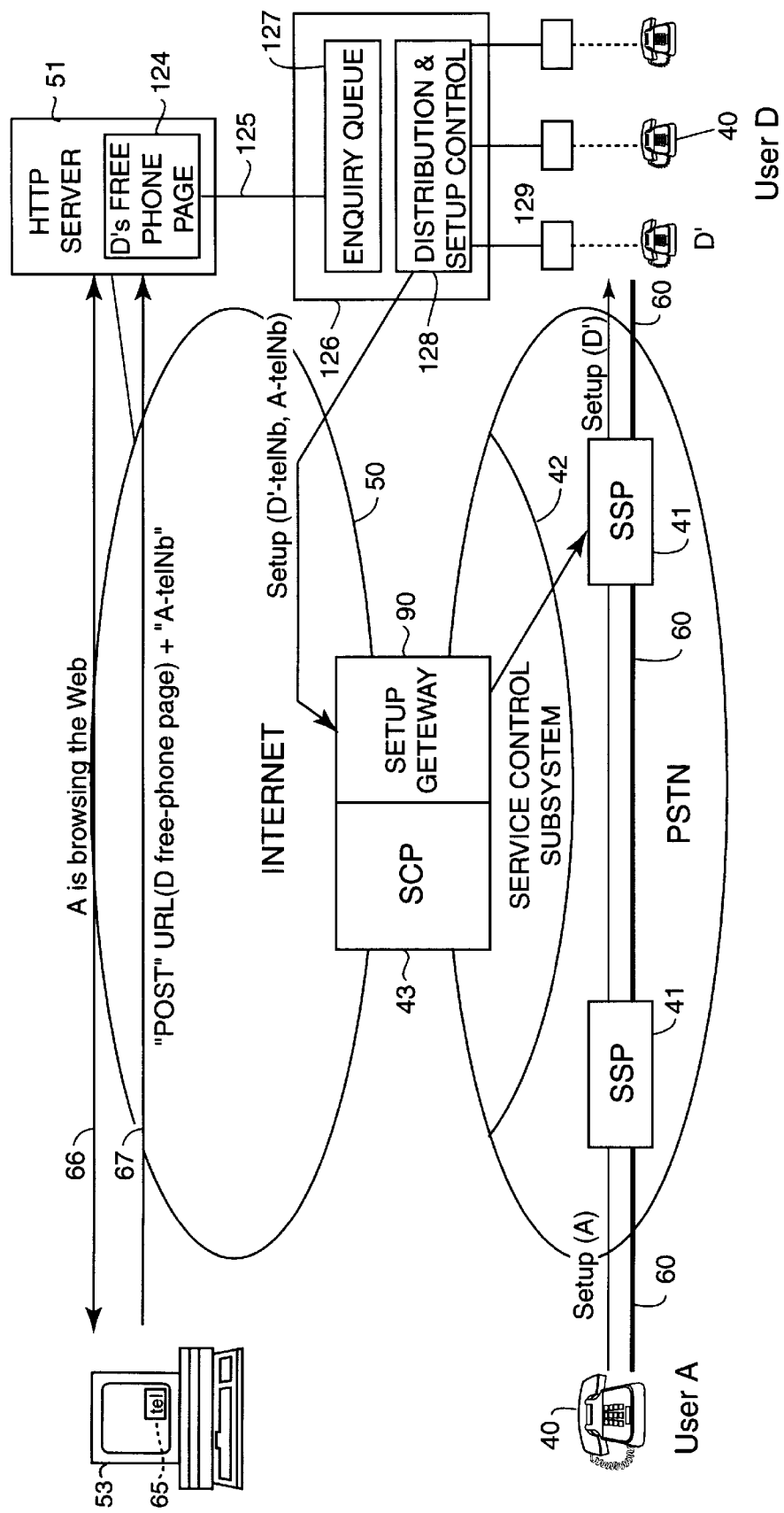
FIG. 17 is a diagram illustrating the overall operation of an arrangement in which a freephone service is implemented for Web users.

In the FIG. 17 arrangement, a user D such as a large department store has a website on a server 51; for the sake of simplicity, it will be assumed that the server is under the control of user D who has direct computer access to the server over line 125. D's Website may, for example, contain many catalogue-like Web pages illustrating goods offered for sale by D. In addition, D has a freephone page 124 for handling enquiries placed on a freephone basis; the URL of this page is associated with a "freephone" graphical button 122 placed on each of the Website catalogue pages.

Suppose user A at terminal 53 is browsing D's Website, looking at the catalogue pages (arrow 121). If A sees an item of interest and wishes to make an enquiry to D about this item, then A can activate at terminal 53 the graphical freephone button 122 associated with the catalogue page concerned. This activation causes code embedded in the catalogue page currently loaded in A's terminal to prompt the user to enter their telephone number and, optionally, their name, after which an HTTP request is sent to D's freephone page using the POST method and enclosing the entered data (arrow 123). D's freephone page on receiving this request executes service logic to enter a new enquiry (including A's name and telephone number) in an enquiry queue 127 maintained in an enquiry control system 126. In the present example, the enquiry control system is connected to the server 51 via line 125, externally of the Internet; however, it would also be possible to have server 51 communicate with the enquiry control system through the Internet and, indeed, this may be the most practical arrangement where D's Website is on an ISP server rather than on a server controlled by D. In fact, the code run in A's terminal upon activation of the freephone graphical button 122 could be arranged to directly forward the enquiry request to the enquiry control system over the Internet rather than passing it back through the server 51.

The enquiry control system 126 manages enquiries passed to it to ensure that they are dealt with in an ordered manner. The system 126 on receiving a new enquiry preferably estimates approximately how long it will be before the enquiry is dealt with, this estimation being based on the number of currently queued enquiries and the average time taken to handle an enquiry. This estimation of waiting time is passed back via server 51 to user A in the response to the POST request message.

The enquiry control system 126 looks after the distribution of enquiries to a number of agents each of which is equipped with a telephone 40 and a display 129. A's enquiry will be dealt with as soon as it reaches the head of the queue 127 and there is an agent detected as available to handle the enquiry (thus, for example, the system may be arranged to detect when an agent's telephone goes on hook). When these conditions are met, a distribution and setup control unit 128 takes A's enquiry and displays A's name and telephone number on the display 129 of the available agent (for clarity, herein referenced as agent D'); if user D keeps a database on D's past customers or credit rating data, then unit 128 will also look for and display any such further information known about A. At the same time, unit 128 makes a third-party call setup request (arrow 130) over the Internet to gateway 90 asking for a call to be set up between the telephone of the available agent D' and the telephone of user A, both telephones being identified by their respective numbers. If both D' and A pick up the call, the enquiry then proceeds, the cost of the call being paid for by D as it is D that originated the call over the PSTN. If, for whatever reason, the call remains incomplete (for example, unanswered by A) for a predetermined timeout period, then unit 128 can be arranged to automatically pass on to the next enquiry at the head of the queue 127.

It would, of course, be possible to dispense with having the unit 128 request call setup through gateway 90 and either have the agent D' dial A's number manually or have unit 126 initiate auto-dialling for D' telephone (agent D' having, for example, a computer-integrated telephone similar to that of A's in FIG. 14). The advantageof these approaches is that the existing PSTN could be used without adaption and without any service installation, in implementing the WWW-based freephone service.

Figure 11:
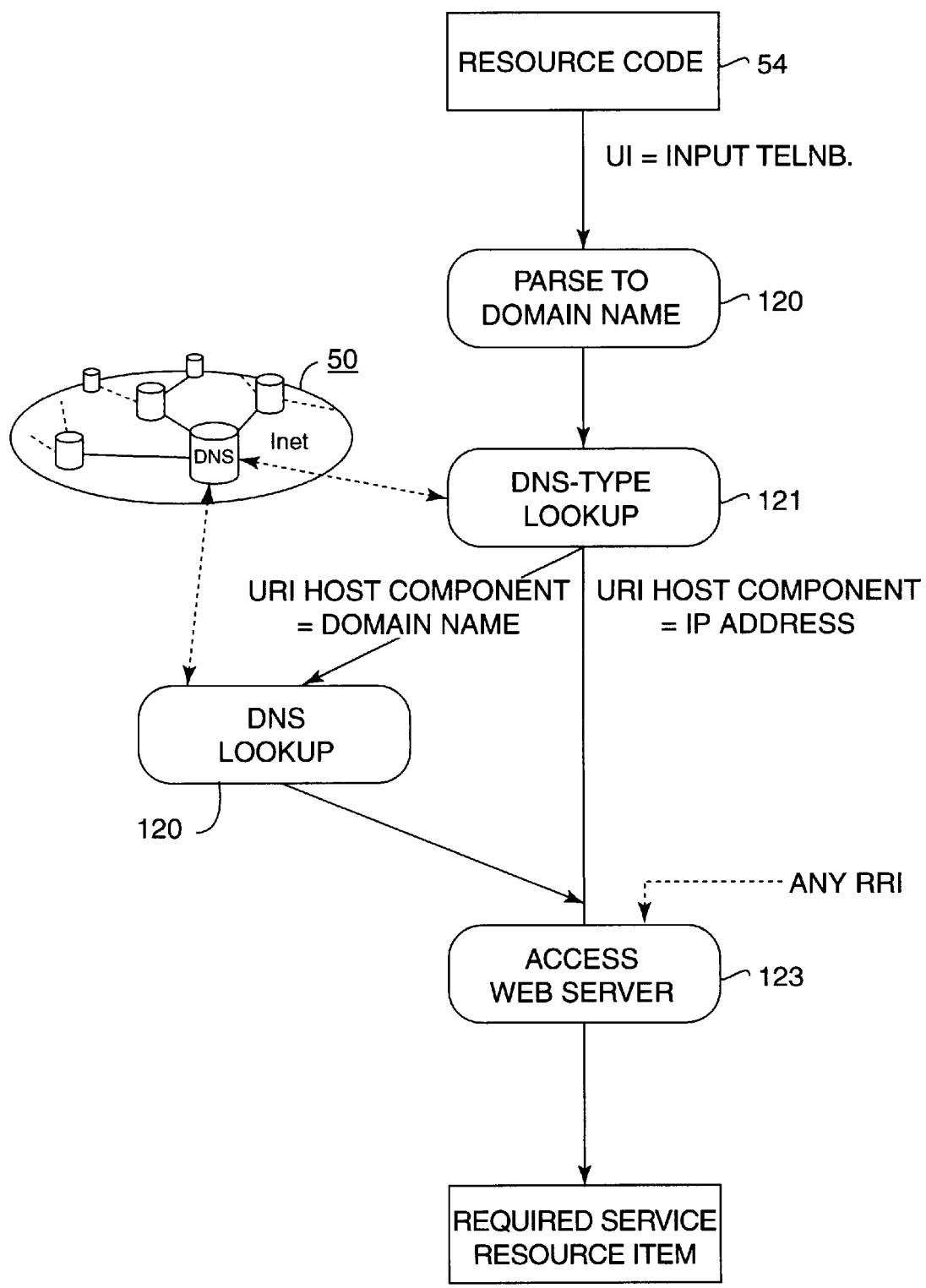
FIG. 11 is a diagram illustrating the derivation of the URI of a service resource by parsing an input telephone number in accordance with the present invention.

As discussed in relation to FIGS. 11 and 13, a complication arises in placing a call to A if A only has Internet access via a SLIP/PPP connection over an ordinary, non-ISDN, PSTN line since, in this case, A's telephone line is already tied up with making Internet access when user D tries to set up a call to A's telephone. The solutions discussed in respect of FIGS. 11 and 13 can also be used here (termination of Internet session; multiplexing voice and Internet data on same telephone line; and placing the call over the Internet to A's terminal). With respect to the solution based on termination of the Internet session, such termination could be delayed until A's enquiry was about to be dealt with; however, to do this, it would be necessary to provide feedback from the control system 126 over the Internet to A's terminal 53 and to associate this feedback with code for bringing about Internet-session termination. One way to achieve this would be to have the response message sent by server 51 in reply to the original POST request message from A, include a correlation code; any subsequent feedback from system 126 passed to A would also include this code (server A having also passed the code to control system 126) thereby allowing A's terminal to correctly identify this feedback. In fact, the same mechanism could be used to provide user A with updates on how much longer user A is likely to be waiting to be called back, this mechanism being usable independently of whether or not there was a conflict problem for use of A's telephone line.

Where user A only has a telephone 40 and no terminal 53, it is still possible to utilise the basic structure of FIG. 17 to provide a freephone service for user A without resorting to the complexity of call charge transfer. More particularly, A would dial a special number for user D's freephone service (typically an 800 number), and the SSP 41 would recognise this special number in standard manner and make a service request to SCP 43 including both this special number and A's number. SCP 43 would then ascertain D's freephone-page URL by doing a number-to-URL translation and access D's freephone page using a POST-method HTTP request similar to request 123. Once this request had been registered as an enquiry by D's freephone page 124, the lattter could send a response to SCP 43 asking it to play an announcement such as "Your freephone enquiry has been registered; please hang up and you will be contacted shortly". This announcement could be played to A by an IP in standard manner. A would then hang up and be ready to receive a call from D.

A significant advantage of the above freephone schemes using WWW, is that user D is not running up charges for use of the PSTN during periods when an enquiry is enqueued, waiting to be handled.

Variants

Many variants are, of course, possible to the above-described arrangements and a number of these variants are described below.

Figure 18:
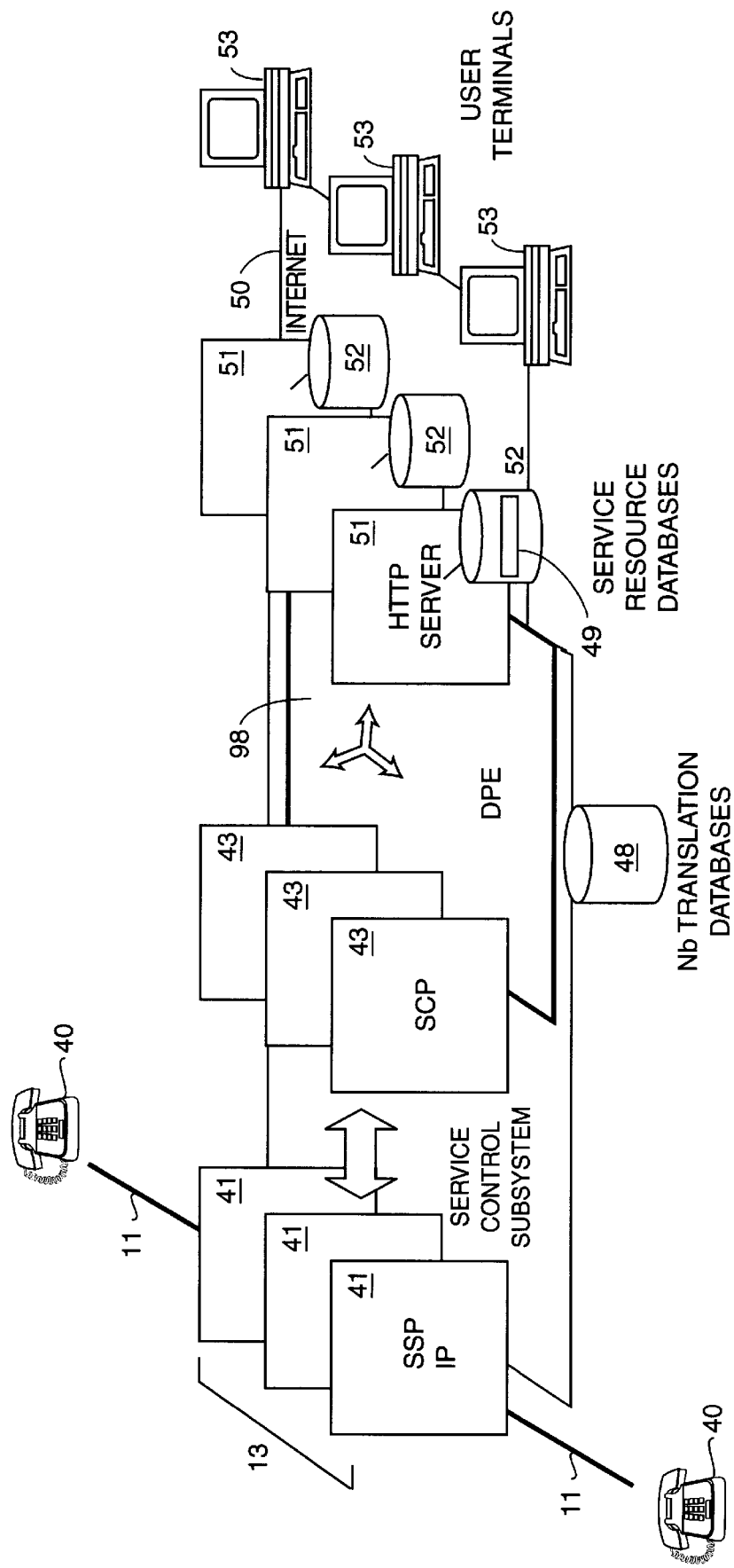
FIG. 18 is a diagram similar to FIG. 6 illustrating the provision of a distributed processing environment for interconnecting elements of the service control subsystem of the PSTN.

Distributed Processing Environment. As is illustrated in FIG. 18, the SCP 43 may access the HTTP servers 51 through a distributed processing environment, DPE 98, at least logically separate from the Internet. Preferably in this case the servers 51 are controlled by PSTN operators and are thus restricted in number.

Service Resources on DNS-Type Servers. In the foregoing examples, the service resource items have been been placed on servers 51 connected to the Internet and a desired service resource has then been accessed over the Internet by the service control subsystem of the PSTN, and/or by Internet users, through the use of an URI derived from a resource code that identifies the the desired service resource item. In a preferred arrangement for deriving the URI from a resource code in the form of a telephone number, all or part of the telephone number concerned was parsed into domain name form and then resolved into an URI using a DNS-type distributed database system that, indeed, could be integrated into the DNS itself (see FIGS. 11 and 12, and related description). In fact, it would be possible to place service resource items directly in Registration Records held by a DNS-type distributed database system so that instead of the parsed telephone number being resolved to an URI which is then used to access the required resource, the parsed telephone number is directly resolved to the required service resource item. The mechanism employed in this process is exactly as already described for resolving a parsed telephone number into an URI. The DNS-type distributed database system used for this would preferably be one accessible over the Internet or the DNS itself so as to provide access to the service resource items for Internet users as well as for the service control subsystem of the PSTN (in the same manner as described above with reference to FIG. 18, the DNS-type servers holding the service resource items may be accessible to the service control subsystem by a network other than the Internet). Whilst the placing of service resource items in RRs held on DNS-type servers may not be suitable for all types of service resource items, it is suitable for items such as telephone numbers that do not change frequently. Thus, a suitable usage is to provide number portability; in this case, a dialled personal number triggers a lookup in the DNS-type system with all or part of the personal number being first parsed and then applied to the DNS type system to return a current number for call routing. All dialled numbers could be treated as personal numbers or simply a subset of such numbers, this subset comprising numbers that are readily identifiable as personal numbers by, for example, local lookup at an SSP or the presence of a predetermined leading digit string. The general concept of parsing a telephone number (or similar number) in whole or in part to form a domain name for resolution in a DNS-type distributed database system can be used for the retrieval of other items of information besides URIs and service resource items.

Feedback Mechanisms. In discussing the WWW-based freephone arrangement of FIG. 17, it was mentioned that user A could be supplied with feedback on the likely length of waiting time before A would be called back. This is one example of using the Internet to provide a feedback path for a potential or actual telephone user. Another example was provided in relation to FIG. 16 where the progress of call setup was reported back by the call setup gateway to user A's terminal. In fact, generally where a user is known to be using a terminal actively on the Internet the opportunity arises to provide the user with feedback on the progress of call setup through the telephone system. In oreder to do this, it is of course necessary to ensure that the feedback can be passed to the appropriate application running on terminal A and this will generally require the application to have made appropriate linking information available. As well as call setup progress information, other information can also be fedback for example during a call holding period. Thus, for example, a special server can be provided on the Internet holding multimedia clips or even videos that could be output to user A during a call holding period.

In the described arrangments, the servers 51 have held service resource items concerned primarily with call setup control. It may be noted that in a somewhat different application, Internet servers could be arranged to hold data that could be accessed from the telephone system in response to a user-initiated telephone request and returned to that telephone user. Such a service would be provided, for example, in response to an SSP triggering a service request upon a particular telephone number being input, the service request prompting an SCP to cause an intelligent peripheral to access a particular Internet server (not necessarily an HTTP server) and retrieve the required data for return to the calling party. The intelligent peripheral may include a text-to-voice converter for replaying the data vocally to the user.

One further feedback process is also worthy of note, in this case in relation to service resource items themselves. By way of example, a telephone user G may subscribe to a service by which calls passed through to G's telephone are to be separated by a minimum of X minutes, X being user settable. To implement this service, G has a phone page on a server 51 that includes a "busy" status indication. Upon termination of a successful call to G, G's local SSP triggers the sending of a message by the associated SCP over the Internet to G's phone page. This message causes G's busy indication to be set to indicate that G is busy; the message also starts a timer which times out after a period X and causes the busy status indication to be reset. A call attempt to G will either be rejected at G's SSP because G's line is genuinely busy or will trigger the SSP to enquire via the SCP whether G's phone-page busy status indication is set. If the busy status indication is set (which it will be during the period X following termination of a successful call) the call attempt is rejected whereas if the busy status indication is in its reset condition, the call attempt is allowed to proceed. By placing the busy status indication mechanism on G's phone page, it is possible to arrange for G to be able to easily change the value of X.

More General Variants. Whilst the service control subsystem of the PSTN has been embodied as an SCP in the foregoing examples, it will be appreciated that the functionality of the service control subsystem could be provided as part of an SSP or in an associated adjunct. Furthermore, the triggering of service requests can be effected by equipment other than SSPs, for example by intercept boxes inserted in the SS7 signalling links.

It will be appreciated that the term "Internet" is to be understood to include not only the current specification of the TCP/IP protocols used for the Internet and the current addressing scheme, but also evolutions of these features such as may be needed to deal with isochronous media. Furthermore, references to the W Wand the HTTP protocol should equally be understood to encompass their evolved descendants.

The present invention can also be applied to telephone systems other than just PSTNs, for example to PLMNs and other mobile networks, and to private systems using PABXs. In this latter case, a LAN or campus-wide computer network serving generally the same internal users as the PABX, will take the role of the Internet in the described embodiments.

Furthermore, the present invention has application where any switched telecommunication system (for example, a broadband ATM system) requires service control and a computer network can be used for the delivery of service resources to the service control subsystem of the telecommunication system.

What is claimed is:

1. A method of accessing a target entity over a communications network, said method comprising the steps of:

(a)—providing a DNS-type distributed database system storing records each associated with a corresponding domain name and holding communication data for use in accessing said target entity, each said domain name being related to a respective number string from which it can be derived by a process including parsing at least a substantial portion of the number string into at least a part of said domain name, said number string being a telephone number;

(b)—supplying a said number string indicative of a said target entity and forming the related said domain name by said process including parsing at least a substantial part of the number string into at least a part of a siad domain name;

(c)—applying the domain name formed in step (b) to the DNS-type distributed database system to retrieve the communication data held in the corresponding said record; and (d)—using the communication data retrieved in step (c) in accessing said target entity.

2. A method according to claim 1, wherein said communications network is a telephone network and the target entity is a called party, said number string comprising a dialed number and the retrieved communication data being a current telephone number for the target party.

3. A method according to claim 1, wherein said communications network is a telephone network and the target entity is a called party, said number string comprising a dialed number and the retrieved communication data being a URI indicative of the location on a computer network of a current telephone number for the target party, said URI being thereafter used to retrieve said current telephone number for use in accessing said target party.

4. A method according to claim 1, wherein said communications network is a computer network and the target entity is a resource item held at a corresponding URI on that network, said number string comprising a telephone number for the target party and the retrieved communication data being the URI of said resource item.

5. A method according to claim 4, wherein said resource item is a current telephone number of a target party it is wished to call, said number string being a personal telephone number for that target party.

6. A method according to claim 1, wherein the parsing of said at least a substantial part of said number string into at least a part of a said domain name involves dividing said substantial portion into label segments according to a division scheme the same for all number strings.

7. A method according to claim 1, wherein said number string is an international telephone number, the parsing of this number involving forming a label segment of the country code component of the international telephone number and forming further label segments from at least a substantial portion of the remainder of the international telephone number according to a division scheme the same for all such numbers.

8. A method according to claim 1, wherein said number string is an international telephone number, the parsing of this number involving forming a label segment of the country code component of the international telephone number and forming further label segments from at least a substantial portion of the remainder of the international telephone number according to a division scheme that is dependent on the identity of said country code component.

9. A method according to claim 1, wherein said DNS-type distributed database system is adapted to handle a set of domain names that make up a name space herein referred to as the "telname space", the root of the telname space being the root of the overall name space handled by the DNS-type distributed database system.

10. A method according to claim 9, wherein said DNS-type distributed database system is distributed over the Internet.

11. A method according to claim 1, wherein said DNS-type distributed database system is provided by the DNS of the Internet and is adapted to handle a set of domain names that make up a name space herein referred to as the "telname space", the telname space being a subdomain of the DNS.

12. A method according to claim 11, wherein said number strings are telephone numbers and the telname space forms a subdomain in the domain .itu.int. of the DNS.

13. A method according to claim 1, wherein said DNS-type distributed database system is provided by the DNS of the Internet and is adapted to handle a set of domain names that make up a name space herein referred to as the "telname space", the telname space being divided between a plurality of subdomains of the DNS.

14. A method according to claim 13, wherein said number strings are telephone numbers and the telname space is provided by respective subdomains in at least some of the country domains of the DNS.

15. A method according to claim 11, wherein a predetermined part of said number string is used to look up a domain name tail that is then added to the domain name part derived by said parsing of at least a substantial portion of the number string.

16. A method according to claim 15, wherein said number string is an international telephone number the country code component of which constitutes said predetermined part used to look up said domain name tail.

17. A method according to claim 12, wherein a predetermined part of said number string is used to look up a domain name tail that is then added to the domain name part derived by said parsing of at least a substantial portion of the number string.

18. A method according to claim 13, wherein a predetermined part of said number string is used to look up a domain name tail that is then added to the domain name part derived by said parsing of at least a substantial portion of the number string.

19. A method according to claim 14, wherein a predetermined part of said number string is used to look up a domain name tail that is then added to the domain name part derived by said parsing of at least a substantial portion of the number string.

* * * * *

Disclaimer 6,131,095—Colin Low, Wootton-Under-Edge; Andrew Franklin Seaborne, Bristol both of United Kingdom. METHOD OF ACCESSING A TARGET ENTITY OVER A COMMUNICATIONS NETWORK. Patent dated October 10, 2000. Disclaimer filed April 17, 2003 by the assignee, Hewlett Packard Company.

Hereby enters this disclaimer to claims 1, 6 and 11 of said patent.

*(Official Gazette, July 15, 2003)*